(12) United States Patent
Tsou

(10) Patent No.: US 10,909,486 B1
(45) Date of Patent: Feb. 2, 2021

(54) INVENTORY PROCESSING USING MERCHANT-BASED DISTRIBUTED WAREHOUSING

(71) Applicant: Square, Inc., San Francisco, CA (US)

(72) Inventor: Victor Tsou, Oakland, CA (US)

(73) Assignee: Square, Inc., San Francisco, CA (US)

( * ) Notice: Subject to any disclaimer, the term of this patent is extended or adjusted under 35 U.S.C. 154(b) by 762 days.

(21) Appl. No.: 14/800,021

(22) Filed: Jul. 15, 2015

(51) Int. Cl.
| G06Q 10/06 | (2012.01) |
| G06Q 10/08 | (2012.01) |
| G06Q 20/20 | (2012.01) |

(52) U.S. Cl.
CPC ..... *G06Q 10/06315* (2013.01); *G06Q 10/087* (2013.01); *G06Q 20/203* (2013.01)

(58) Field of Classification Search
CPC ........... G06Q 10/06315; G06Q 10/087; G06Q 20/203
USPC ....................................................... 705/7.25
See application file for complete search history.

(56) References Cited

U.S. PATENT DOCUMENTS

| 5,057,829 | A | 10/1991 | Velazquez |
| 5,168,445 | A | 12/1992 | Kawashima et al. |
| 5,765,143 | A | 6/1998 | Sheldon et al. |
| 5,933,813 | A | 8/1999 | Teicher et al. |
| 6,151,582 | A | 11/2000 | Huang et al. |
| 6,431,444 | B1 | 8/2002 | Gatto |
| 6,595,342 | B1 * | 7/2003 | Maritzen ................ G06Q 20/02 194/212 |
| 6,609,101 | B1 | 8/2003 | Landvater |
| 6,687,679 | B1 | 2/2004 | Van Luchene et al. |
| 7,013,290 | B2 | 3/2006 | Ananian |
| 7,092,929 | B1 | 8/2006 | Dvorak et al. |
| 7,222,786 | B2 | 5/2007 | Renz et al. |
| 7,343,319 | B1 | 3/2008 | Walker et al. |
| 7,552,066 | B1 | 6/2009 | Landvater |
| 7,660,738 | B1 | 2/2010 | Siegel et al. |
| 7,720,708 | B1 | 5/2010 | Elkins, II et al. |
| 7,792,256 | B1 | 9/2010 | Arledge et al. |
| 7,818,284 | B1 | 10/2010 | Walker et al. |
| 7,882,209 | B1 | 2/2011 | Eslambolchi et al. |
| 7,941,331 | B2 | 5/2011 | Dogan et al. |
| 7,979,299 | B1 | 7/2011 | Mehta et al. |
| 8,001,017 | B1 | 8/2011 | Franco |
| 8,103,538 | B2 | 1/2012 | Bamberg et al. |
| 8,204,799 | B1 | 6/2012 | Murray et al. |

(Continued)

FOREIGN PATENT DOCUMENTS

CA    2 332 083 A1    7/2001

OTHER PUBLICATIONS

E-solutions for surplus inventory. Myers, Chuck. DSN Retailing Today 39.21: 13. Lebhar-Friedman, Inc. (Nov. 6, 2000).*

(Continued)

*Primary Examiner* — Timothy Padot
(74) *Attorney, Agent, or Firm* — Lee & Hayes, P.C.

(57) ABSTRACT

In some examples, a service provider may cause inventory of one merchant to be supplied to another merchant. The service provider may monitor inventory of merchants to determine that a merchant has extra inventory and that another merchant lacks inventory. The service provider may cause the extra inventory of the merchant to be transported to the other merchant that lacks inventory. The service provider may select a courier and request that the courier delivery the extra inventory.

20 Claims, 13 Drawing Sheets

(56) References Cited

U.S. PATENT DOCUMENTS

| | | |
|---|---|---|
| 8,239,296 B2 | 8/2012 | Itoi et al. |
| 8,355,954 B1 | 1/2013 | Goldberg et al. |
| 8,417,572 B1 | 4/2013 | Chenault |
| 8,438,066 B1 | 5/2013 | Yuen et al. |
| 8,533,053 B2 | 9/2013 | Brown et al. |
| 8,650,062 B2 | 2/2014 | Krech |
| 8,732,040 B1 | 5/2014 | Prabhune et al. |
| 9,168,315 B1 | 10/2015 | Scaringe et al. |
| 9,323,441 B1 | 4/2016 | Minks-Brown et al. |
| 9,619,483 B1 | 4/2017 | Robinson et al. |
| 9,619,831 B1 | 4/2017 | Kumar et al. |
| 9,659,310 B1 | 5/2017 | Allen et al. |
| 9,786,005 B1 | 10/2017 | Poursartip et al. |
| 9,792,597 B1 | 10/2017 | Jen et al. |
| 10,318,569 B1 | 6/2019 | Funk et al. |
| 10,339,548 B1 | 7/2019 | Kumar et al. |
| 10,373,118 B1 | 8/2019 | Lefkow et al. |
| 10,467,583 B1 | 11/2019 | Jen et al. |
| 2001/0034722 A1 | 10/2001 | Tidball et al. |
| 2001/0042008 A1 | 11/2001 | Hull et al. |
| 2002/0010661 A1 | 1/2002 | Waddington et al. |
| 2002/0065839 A1 | 5/2002 | McCulloch |
| 2002/0072988 A1 | 6/2002 | Aram |
| 2002/0091595 A1 | 7/2002 | Itoi et al. |
| 2002/0133368 A1 | 9/2002 | Strutt et al. |
| 2002/0147656 A1 | 10/2002 | Tam et al. |
| 2002/0188579 A1 | 12/2002 | Liu et al. |
| 2003/0006098 A1 | 1/2003 | Wike, Jr. et al. |
| 2003/0018701 A1 | 1/2003 | Kaestle et al. |
| 2003/0026404 A1 | 2/2003 | Joyce et al. |
| 2003/0033179 A1* | 2/2003 | Katz .................. G06Q 10/0631 705/7.12 |
| 2003/0046133 A1* | 3/2003 | Morley ............... G06Q 10/0639 705/7.12 |
| 2003/0151821 A1 | 8/2003 | Favalora et al. |
| 2003/0216969 A1 | 11/2003 | Bauer et al. |
| 2004/0019552 A1 | 1/2004 | Tobin |
| 2004/0030428 A1 | 2/2004 | Crampton et al. |
| 2004/0039639 A1 | 2/2004 | Walker et al. |
| 2004/0098311 A1 | 5/2004 | Nair et al. |
| 2004/0153359 A1 | 8/2004 | Ho et al. |
| 2004/0181753 A1 | 9/2004 | Michaelides |
| 2004/0186783 A1 | 9/2004 | Knight et al. |
| 2004/0267640 A1 | 12/2004 | Bong et al. |
| 2005/0149414 A1 | 7/2005 | Schrodt et al. |
| 2005/0250555 A1 | 11/2005 | Richardson et al. |
| 2005/0273377 A1 | 12/2005 | Ouimet et al. |
| 2006/0031085 A1 | 2/2006 | Postel et al. |
| 2006/0106699 A1 | 5/2006 | Hitalenko et al. |
| 2006/0195563 A1* | 8/2006 | Chapin ............... H04L 67/1095 709/223 |
| 2006/0224470 A1 | 10/2006 | Garcia Ruano et al. |
| 2006/0235726 A1 | 10/2006 | Paraison et al. |
| 2006/0235739 A1* | 10/2006 | Levis ..................... G06Q 10/08 705/1.1 |
| 2006/0253330 A1 | 11/2006 | Maggio et al. |
| 2007/0124221 A1 | 5/2007 | Itoi et al. |
| 2007/0244765 A1 | 10/2007 | Hunter et al. |
| 2008/0077459 A1 | 3/2008 | Desai et al. |
| 2008/0082427 A1 | 4/2008 | Gandhi et al. |
| 2008/0103846 A1 | 5/2008 | Armstrong et al. |
| 2008/0120206 A1 | 5/2008 | Weiler et al. |
| 2008/0147507 A1 | 6/2008 | Langhammer |
| 2008/0191881 A1 | 8/2008 | Minerley |
| 2008/0198761 A1 | 8/2008 | Murawski et al. |
| 2008/0201232 A1 | 8/2008 | Walker et al. |
| 2008/0216001 A1 | 9/2008 | Ording et al. |
| 2008/0228582 A1* | 9/2008 | Fordyce ............. G06Q 30/0239 705/14.27 |
| 2008/0281792 A1 | 11/2008 | Pickett et al. |
| 2008/0301095 A1 | 12/2008 | Zhu et al. |
| 2009/0089148 A1 | 4/2009 | Gujjar et al. |
| 2009/0222337 A1 | 9/2009 | Sergiades |
| 2009/0299794 A1* | 12/2009 | Marchi ............. G06Q 30/0601 705/7.11 |
| 2010/0138037 A1 | 6/2010 | Adelberg et al. |
| 2010/0169130 A1 | 7/2010 | Fineman et al. |
| 2010/0174596 A1 | 7/2010 | Gilman et al. |
| 2010/0234986 A1 | 9/2010 | Clopton et al. |
| 2011/0010448 A1 | 1/2011 | Gill et al. |
| 2011/0011931 A1 | 1/2011 | Farley et al. |
| 2011/0034722 A1 | 2/2011 | Muroi et al. |
| 2011/0042008 A1 | 2/2011 | Hori et al. |
| 2011/0047022 A1 | 2/2011 | Walker et al. |
| 2011/0054649 A1 | 3/2011 | Sarkis et al. |
| 2011/0054992 A1 | 3/2011 | Liberty et al. |
| 2011/0066504 A1 | 3/2011 | Chatow et al. |
| 2011/0082734 A1 | 4/2011 | Zhang et al. |
| 2011/0191861 A1 | 8/2011 | Spears |
| 2011/0213644 A1 | 9/2011 | Phene |
| 2011/0225023 A1 | 9/2011 | Evens et al. |
| 2011/0238577 A1 | 9/2011 | Shuster |
| 2011/0258083 A1 | 10/2011 | Ren |
| 2011/0258117 A1 | 10/2011 | Ahmad et al. |
| 2011/0313840 A1 | 12/2011 | Mason et al. |
| 2012/0016758 A1 | 1/2012 | Bouaziz et al. |
| 2012/0041675 A1* | 2/2012 | Juliver ............... G06Q 30/0283 701/465 |
| 2012/0054076 A1* | 3/2012 | Wu ....................... G06Q 10/087 705/28 |
| 2012/0084119 A1* | 4/2012 | Vandehey .......... G06Q 30/0202 705/7.31 |
| 2012/0095882 A1 | 4/2012 | Wolff |
| 2012/0116810 A1 | 5/2012 | Knowlton et al. |
| 2012/0209661 A1 | 8/2012 | Bennett et al. |
| 2012/0311723 A1 | 12/2012 | Britt, Jr. et al. |
| 2013/0006742 A1 | 1/2013 | Richard |
| 2013/0046634 A1 | 2/2013 | Grigg et al. |
| 2013/0066698 A1 | 3/2013 | Levy et al. |
| 2013/0066733 A1 | 3/2013 | Levy et al. |
| 2013/0124360 A1 | 5/2013 | Mitrovic |
| 2013/0126610 A1 | 5/2013 | Aihara et al. |
| 2013/0132140 A1 | 5/2013 | Amin et al. |
| 2013/0132180 A1 | 5/2013 | Aihara et al. |
| 2013/0132193 A1 | 5/2013 | Aihara et al. |
| 2013/0132218 A1 | 5/2013 | Aihara et al. |
| 2013/0132246 A1 | 5/2013 | Amin et al. |
| 2013/0132887 A1 | 5/2013 | Amin et al. |
| 2013/0166332 A1 | 6/2013 | Hammad |
| 2013/0169413 A1 | 7/2013 | Schuessler |
| 2013/0173435 A1 | 7/2013 | Cozad, Jr. |
| 2013/0246176 A1 | 9/2013 | Chang et al. |
| 2013/0246207 A1 | 9/2013 | Novak et al. |
| 2013/0246301 A1 | 9/2013 | Radhakrishnan et al. |
| 2013/0282392 A1 | 10/2013 | Wurm |
| 2013/0311211 A1 | 11/2013 | Zafar et al. |
| 2013/0325672 A1 | 12/2013 | Odenheimer et al. |
| 2014/0012704 A1 | 1/2014 | Mizhen et al. |
| 2014/0025524 A1 | 1/2014 | Sims et al. |
| 2014/0046748 A1 | 2/2014 | Nagarajan et al. |
| 2014/0067596 A1 | 3/2014 | McGovern et al. |
| 2014/0067677 A1 | 3/2014 | Ali et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0149201 A1 | 5/2014 | Abbott et al. |
| 2014/0164126 A1* | 6/2014 | Nicholas .................. A63F 9/24 705/14.58 |
| 2014/0173020 A1 | 6/2014 | Reilly et al. |
| 2014/0180959 A1* | 6/2014 | Gillen ................ G06Q 10/0833 705/341 |
| 2014/0222711 A1* | 8/2014 | Tibbs .................. G06Q 10/0833 705/337 |
| 2014/0244416 A1 | 8/2014 | Venkat et al. |
| 2014/0249941 A1 | 9/2014 | Hicks et al. |
| 2014/0279035 A1 | 9/2014 | Fleming et al. |
| 2014/0279204 A1 | 9/2014 | Roketenetz et al. |
| 2014/0279241 A1 | 9/2014 | Bartholomew et al. |
| 2014/0297470 A1* | 10/2014 | Ramadge .......... G06Q 30/0635 705/26.41 |
| 2014/0330685 A1 | 11/2014 | Nazzari |

(56) References Cited

U.S. PATENT DOCUMENTS

| | | |
|---|---|---|
| 2014/0344118 A1 | 11/2014 | Parpia et al. |
| 2015/0066671 A1 | 3/2015 | Nichols et al. |
| 2015/0095091 A1 | 4/2015 | Kamdar |
| 2015/0100433 A1 | 4/2015 | Choy et al. |
| 2015/0134552 A1 | 5/2015 | Engels et al. |
| 2015/0161714 A1 | 6/2015 | Fainshtein |
| 2015/0178654 A1 | 6/2015 | Glasgow et al. |
| 2015/0269521 A1* | 9/2015 | Knapp .............. G06Q 10/08355 705/338 |
| 2015/0278912 A1 | 10/2015 | Melcher et al. |
| 2015/0302510 A1 | 10/2015 | Godsey et al. |
| 2015/0310383 A1 | 10/2015 | Iser et al. |
| 2015/0310397 A1 | 10/2015 | Xu |
| 2015/0332414 A1 | 11/2015 | Unser |
| 2016/0086222 A1 | 3/2016 | Kurapati |
| 2016/0092827 A1 | 3/2016 | Colodny et al. |
| 2016/0275424 A1 | 9/2016 | Concannon et al. |
| 2016/0321677 A1 | 11/2016 | Dobaj |
| 2017/0011423 A1 | 1/2017 | Douglas et al. |
| 2017/0032382 A1 | 2/2017 | Shulman et al. |
| 2017/0236152 A1 | 8/2017 | Dimaunahan et al. |
| 2017/0345105 A1 | 11/2017 | Isaacson et al. |
| 2018/0025442 A1 | 1/2018 | Isaacson et al. |
| 2018/0150387 A1 | 5/2018 | Kogan et al. |
| 2018/0204256 A1 | 7/2018 | Bifolco et al. |
| 2018/0232817 A1 | 8/2018 | Isaacson et al. |
| 2018/0315111 A1 | 11/2018 | Alvo et al. |
| 2018/0365753 A1 | 12/2018 | Fredrich et al. |
| 2019/0272497 A1 | 9/2019 | Tingler et al. |
| 2019/0287125 A1 | 9/2019 | Kumar et al. |
| 2019/0295148 A1 | 9/2019 | Lefkow et al. |
| 2019/0310126 A1 | 10/2019 | Gurumohan et al. |

OTHER PUBLICATIONS

TradeOut aims to move out excess inventory. Smith, Eric. American Metal Market 107.218: 8. Euromoney Institutional Investor PLC. (Nov. 11, 1999).*

U.S. Appl. No. 14/800,090, of Tsou, V., filed Jul. 15, 2015.

Non-Final Office Action dated Jan. 26, 2018, for U.S. Appl. No. 14/800,090, of Tsou, V., filed Jul. 15, 2015.

Non-Final Office Action dated Apr. 24, 2017, for U.S. Appl. No. 14/700,044, of Brock, Z., et al., filed Apr. 29, 2015.

Non-Final Office Action dated Jun. 15, 2017, for U.S. Appl. No. 14/289,467, of Kumar, A., et al., filed May 28, 2014.

Non-Final Office Action dated Jun. 30, 2017, for U.S. Appl. No. 14/522,208, of Cieri, M., et al., filed Oct. 23, 2014.

Final Office Action dated Sep. 6, 2017, for U.S. Appl. No. 14/700,044, of Brock, Z., et al., filed Apr. 29, 2015.

Advisory Action dated Nov. 9, 2017, for U.S. Appl. No. 14/700,044, of Brock, Z., et al., filed Apr. 29, 2015.

Final Office Action dated Nov. 22, 2017, for U.S. Appl. No. 14/289,467, of Kumar, A., et al., filed May 28, 2014.

Final Office Action dated Nov. 24, 2017, for U.S. Appl. No. 14/522,208, of Cieri, M.M., et al., filed Oct. 23, 2014.

Non-Final Office Action dated Feb. 5, 2018, for U.S. Appl. No. 14/700,013, of Brock, Z., et al., filed Apr. 29, 2015.

Advisory Action dated Feb. 6, 2018, for U.S. Appl. No. 14/289,467, of Kumar, A., et al., filed May 28, 2014.

Non-Final Office Action dated Apr. 10, 2018, for U.S. Appl. No. 14/700,044, of Brock, Z., et al., filed Apr. 29, 2015.

Non-Final Office Action dated Apr. 18, 2018, for U.S. Appl. No. 14/289,467, of Kumar, A., et al., filed May 28, 2014.

Chen, F., and Samroengraja, R., "A Staggered Ordering Policy for One-Warehouse, Multiretailer Systems," Operations Research, vol. 48, Issue 2, pp. 281-293 (Apr. 1, 2000).

Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," INFORMS Transactions on Education, vol. 6, Issue 3, pp. 3-19 (May 1, 2006).

Ross, D.F., "Replenishment Inventory Planning," Chapter 7 of Distribution Planning and Control: Managing in the Era of Supply Chain Management, Chapman & Hall, pp. 263-319 (1996).

Wah, B.W., "Wiley Encyclopedia of Computer Science and Engineering," Wiley-Interscience, vol. 1, pp. 1-2365 (Nov. 2008).

Final Office Action dated Jul. 26, 2018, for U.S. Appl. No. 14/800,090, of Tsou, V., filed Jul. 15, 2015.

Non-Final Office Action dated Aug. 6, 2018, for U.S. Appl. No. 14/964,231, of Jen, M., et al., filed Dec. 9, 2015.

Final Office Action dated Aug. 15, 2018, for U.S. Appl. No. 14/700,013, of Brock, Z., et al., filed Apr. 29, 2015.

Non-Final Office Action dated Aug. 28, 2018, for U.S. Appl. No. 14/522,208, of Cieri, M.M., et al., filed Oct. 23, 2014.

Non-Final Office Action dated Sep. 6, 2018, for U.S. Appl. No. 15/858,911, of Funk, M., et al., filed Dec. 29, 2017.

Non-Final Office Action dated Sep. 14, 2018, for U.S. Appl. No. 14/964,263, of Jen, M., et al., filed Dec. 9, 2015.

Final Office Action dated Sep. 24, 2018, for U.S. Appl. No. 14/700,044, of Brock, Z., et al., filed Apr. 29, 2015.

Non-Final Office Action dated Jul. 30, 2019, for U.S. Appl. No. 14/964,263, of Jen, M., et al., filed Dec. 9, 2015.

Non-Final Office Action dated Jun. 3, 2019, for U.S. Appl. No. 14/700,044, of Brock, Z., et al., filed Apr. 29, 2015.

Bidgoli, H., "The Internet Encyclopedia", John Wiley and Sons, vol. 1, pp. 2735 (2004), Part 1.

Bidgoli, H., "The Internet Encyclopedia", John Wiley and Sons, vol. 1, pp. 2735 (2004), Part 2.

Bidgoli, H., "The Internet Encyclopedia", John Wiley and Sons, vol. 1, pp. 2735 (2004), Part 3.

Bidgoli, H., "The Internet Encyclopedia", John Wiley and Sons, vol. 1, pp. 2735 (2004), Part 4.

Bidgoli, H., "The Internet Encyclopedia", John Wiley and Sons, vol. 1, pp. 2735 (2004), Part 5.

Bidgoli, H., "The Internet Encyclopedia", John Wiley and Sons, vol. 1, pp. 2735 (2004), Part 6.

Bidgoli, H., "The Internet Encyclopedia", John Wiley and Sons, vol. 1, pp. 2735 (2004), Part 7.

Bidgoli, H., "The Internet Encyclopedia", John Wiley and Sons, vol. 1, pp. 2735 (2004), Part 8.

Bidgoli, H., "The Internet Encyclopedia", John Wiley and Sons, vol. 1, pp. 2735 (2004), Part 9.

Bidgoli, H., "The Internet Encyclopedia", John Wiley and Sons, vol. 1, pp. 2735 (2004), Part 10.

Bidgoli, H., "The Internet Encyclopedia", John Wiley and Sons, vol. 1, pp. 2735 (2004), Part 11.

Bidgoli, H., "The Internet Encyclopedia", John Wiley and Sons, vol. 1, pp. 2735 (2004), Part 12.

Bidgoli, H., "The Internet Encyclopedia", John Wiley and Sons, vol. 1, pp. 2735 (2004), Part 13.

Bidgoli, H., "The Internet Encyclopedia", John Wiley and Sons, vol. 1, pp. 2735 (2004), Part 14.

Bidgoli, H., "The Internet Encyclopedia", John Wiley and Sons, vol. 1, pp. 2735 (2004), Part 15.

Bidgoli, H., "The Internet Encyclopedia", John Wiley and Sons, vol. 1, pp. 2735 (2004), Part 16.

Bidgoli, H., "The Internet Encyclopedia", John Wiley and Sons, vol. 1, pp. 2735 (2004), Part 17.

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

Advisory Action dated Oct. 30, 2018, for U.S. Appl. No. 14/800,090, of Tsou, V., filed Jul. 15, 2015.

Final Office Action dated Nov. 14, 2018, for U.S. Appl. No. 14/289,467, of Kumar, A., et al., filed May 28, 2014.

Advisory Action dated Dec. 5, 2018, for U.S. Appl. No. 14/700,044, of Brick Z., et al., filed Dec. 9, 2015.

Final Office Action dated Jan. 17, 2019, for U.S. Appl. No. 14/964,263, of Mark, J., et al. filed Dec. 9, 2015.

Notice of Allowance dated Jan. 29, 2019, for U.S. Appl. No. 15/858,911, of Funk, M., et al., filed Dec. 29, 2017.

Final Office Action dated Feb. 6, 2019, for U.S. Appl. No. 14/964,231, of Jen, M., et al. filed Dec. 9, 2015.

(56) References Cited

OTHER PUBLICATIONS

Notice of Allowance dated Feb. 7, 2019, for U.S. Appl. No. 14/289,467, of Kumar, A., et al., filed May 28, 2014.
Advisory Action dated Apr. 1, 2019, for U.S. Appl. No. 14/964,263, of Mark, J., et al. filed Dec. 9, 2015.
Advisory Action dated Apr. 22, 2019, for U.S. Appl. No. 14/522,208, of Cieri, M.M., et al., filed Oct. 23, 2014.
Advisory Action dated Apr. 30, 2019, for U.S. Appl. No. 14/964,231, of Jen, M., et al., filed Dec. 9, 2015.
Non Final Office Action dated Jun. 14, 2019, for U.S. Appl. No. 14/522,208, of Cieri, M.M., et al., filed Oct. 23, 2014.
Notice of Allowance dated Jun. 20, 2019, for U.S. Appl. No. 14/964,231, of Jen, M., et al., filed Dec. 9, 2015.
Non Final Office Action dated Sep. 20, 2019, for U.S. Appl. No. 14/800,090, of Tsou, V., filed Jul. 15, 2015.
Final Office Action dated Dec. 27, 2019, for U.S. Appl. No. 14/522,208, of Cieri, M.M., et al., filed Oct. 23, 2014.
Final Office Action dated Jan. 22, 2020, for U.S. Appl. No. 14/964,263, of Jen, M., et al., filed Dec. 9, 2015.
Non Final Office Action dated Mar. 10, 2020, for U.S. Appl. No. 16/051,257, of Capers M., et al., filed Jul. 31, 2018.
Non Final Office Action dated Mar. 19, 2020, for U.S. Appl. No. 16/204,583, of Gjertson, N., et al., filed Nov. 29, 2018.
Final Office Action dated Mar. 20, 2020, for U.S. Appl. No. 14/800,090, of Tsou, V., filed Jul. 15, 2015.
Non Final Office Action dated Mar. 26, 2020, for U.S. Appl. No. 16/431,671, of Kumar, A., et al., filed Jun. 4, 2019.
Advisory Action dated Mar. 30, 2020, for U.S. Appl. No. 14/964,263, of Jen, M., et al., filed Dec. 9, 2015.
Non-Final Office Action dated Jul. 15, 2020, for U.S. Appl. No. 14/700,013, of Brock, Z., et al., filed Apr. 29, 2015.
Final Office Action dated Jul. 16, 2020, for U.S. Appl. No. 16/051,257, of Capers M., et al., filed Jul. 31, 2018.
Advisory Action dated Jun. 22, 2020, for U.S. Appl. No. 14/800,090, of Tsou, V., filed Jul. 15, 2015.
Non Final Office Action dated Jun. 29, 2020, for U.S. Appl. No. 14/964,263, of Jen, M., et al., filed Dec. 9, 2015.
"2019 Revised Patent Subject Matter Eligibility Guidance", Federal Register, vol. 84, No. 4, (Jan. 7, 2019), pp. 50-57.
"Oct. 2019 Update: Subject Matter Eligibility", (Oct. 17, 2019), 22 pages.
Notice of Allowance dated Nov. 5, 2020, for U.S. Appl. No. 14/800,090, of Tsou, V., filed Jul. 15, 2015.

\* cited by examiner

INVENTORY PROCESSING USING MERCHANT-BASED DISTRIBUTED WAREHOUSING

BACKGROUND

Merchants conduct transactions with buyers for various types of goods and services. These merchants often attempt to maintain certain levels of inventory so that the merchants may provide an item to a buyer when purchased. For example, a merchant may order additional inventory of an item from a supplier when the merchant notices that the inventory is relatively low. In many instances, multiple merchants order a same item at the same time from a supplier. This often causes the supplier to be overloaded with demand and to delay shipments to merchants.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
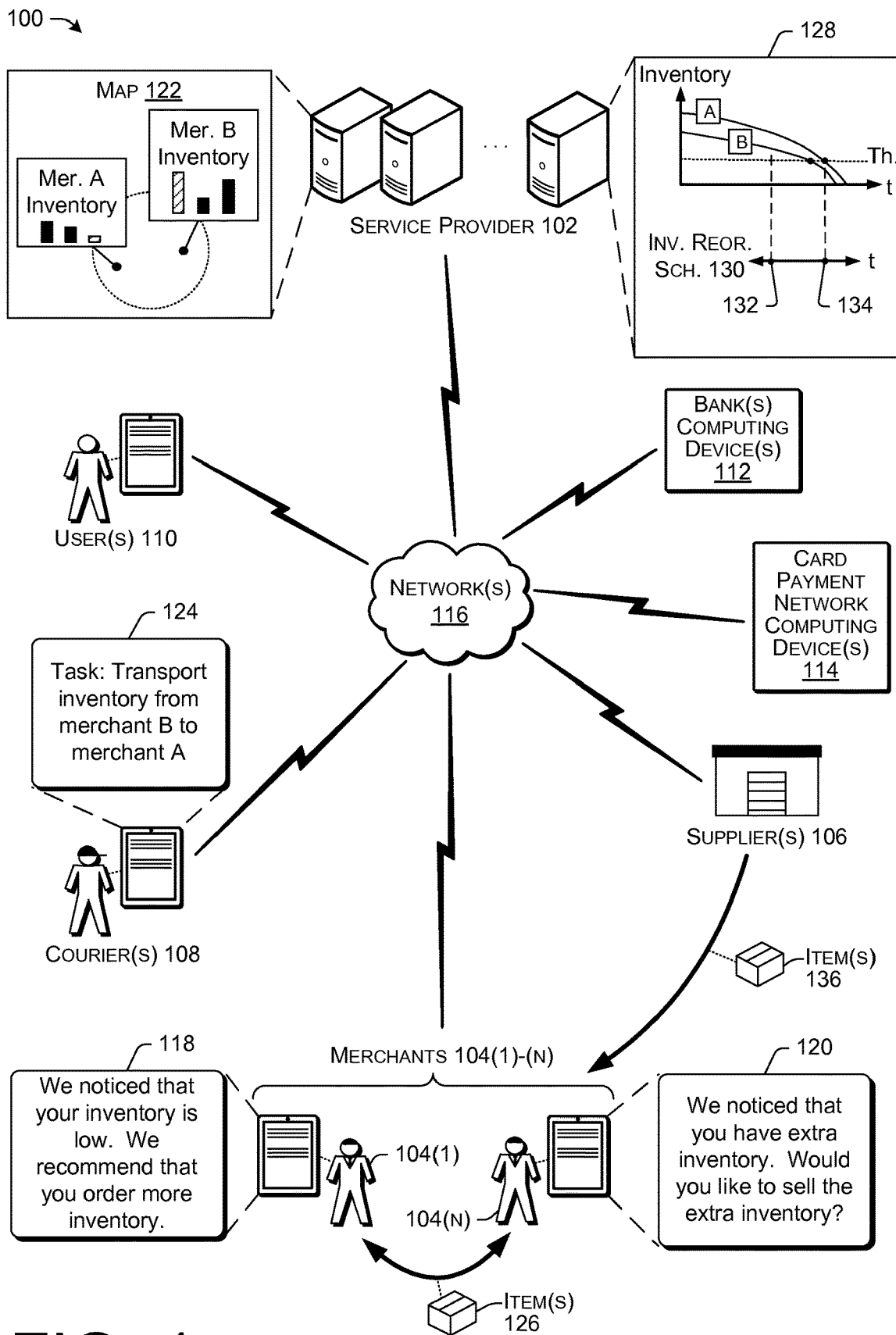
FIG. 1 illustrates an example architecture in which the techniques discussed herein may be implemented.

The technology herein provides a novel system and environment for performing various inventory processing operations to control inventory of items for merchants. Some implementations discussed herein enable any merchant (e.g., with excess inventory) to participate as a supplier to any other merchant (e.g., that is lacking inventory) to facilitate inventory distribution between the merchants. For example, merchants, who want to place inventory orders for delivery, may be constrained to ordering from certain merchants who have excess inventory based on variations in local conditions. For instance, a merchant who is placing an order for inventory may be provided with the opportunity to order from selected merchants based on locations of the merchants and/or locations of couriers (e.g., indicating predicted courier travel times to the merchants). In some cases, the locations of the merchants and/or couriers may be determined by a GPS (Global Positioning System) receiver or other location sensor onboard a merchant or courier device, and this location information may be transmitted to a service computing device. The technology herein employs a plurality of computing devices, mobile devices, and location sensors to provide a novel technological arrangement that provides varying options for ordering inventory based at least in part on locations of merchants and couriers. In some instances, the technology may allow merchants to maintain appropriate inventory levels (e.g., sell excess inventory, receive additional inventory as needed, and so on).

In some implementations of distributing inventory between merchants, a service provider may monitor inventory of items for multiple merchants. The monitoring may be based on transaction information describing sales of items by the respective merchants. Based on the monitoring, the service provider may determine that a first merchant has extra inventory of an item. For example, it may be determined that a quantity of items in the inventory of the item for the first merchant is more than an estimated number of items to be sold by the first merchant over a future period of time (e.g., the next three weeks), that at least part of the inventory of the item has remained with the first merchant for more than a predetermined amount of time (e.g., more than a number of days, weeks, months, etc.), and so on. As such, the service provider may send a communication to the first merchant to inform the first merchant of the extra inventory and suggest that the extra inventory be made available for others to purchase. If the first merchant requests to sell the extra inventory, the service provider may designate the extra inventory as being available for purchase.

Further, the service provider may determine that a second merchant lacks inventory of an item. In one example, it may be determined that a quantity of items in the inventory of the item for the second merchant is less than an estimated number of items to be sold by the second merchant over a future period of time (e.g., over the next week). In another example, the service provider may determine that the second merchant lacks inventory of the item when the second merchant places an order for additional inventory of the item. In some instances, when it is determined that the second merchant lacks inventory, the service provider may send a communication to the second merchant recommending that the second merchant order additional inventory. In response, the second merchant may request additional inventory. In other instances, the second merchant may opt in to automatic ordering and the service provider may automatically place an order for additional inventory upon determining that the second merchant lacks inventory. In any event, when it is determined that a request is being made for additional inventory, the service provider may attempt to find extra inventory from another merchant to satisfy the request. In some instances, if a merchant is not found, then an order may be placed with a supplier, such as a supplier that is typically used by the second merchant or any other supplier.

The service provider may utilize various factors in attempting to identify a merchant that may satisfy a request for additional inventory. For example, the service provider may consider locations of merchants (e.g., a proximity of a merchant to the second merchant), a number of items in an existing inventory that are being sold, a cost of items being sold, a location of a courier (e.g., a proximity to a merchant that may satisfy the request, a proximity to the second merchant, and so on), and so on. In this implementation, the service provider determines that the first merchant has extra inventory of the same item being requested and is located within a predetermined distance to the second merchant. The service provider may also determine that the extra inventory of the item for the first merchant is greater in quantity than that being requested by the second merchant. Accordingly, the service provider selects the first merchant to provide additional inventory of the item to the second merchant.

Additionally, or alternatively, the service provider may identify a courier to transport the extra inventory of the item. In some instances, the service provider may manage couriers that employ respective devices to arrange deliveries of items for the couriers. To do so, the service provider may track locations of the couriers (e.g., via location sensors), monitor availability of the couriers, and so on. This information may be used by the service provider to identify a courier to deliver the extra inventory. Some implementations herein provide technological innovations that enable people to participate as couriers in a new type of crowdsourced service economy. With such technology, essentially any person with a mobile device is able to immediately become a courier, or cease to be a courier, in a courier network that provides delivery services for delivery of items. Additionally, through the interaction of the plurality of computing devices, mobile devices, and location sensors, implementations herein are able to track the movement of couriers throughout a service region over time, and can use this information to assist in predicting courier travel times to various delivery locations for various different times of days and days of the week.

In any event, the service provider may identify a courier to transport the extra inventory and send a notification to the courier requesting that the extra inventory be picked-up at an establishment of the first merchant and delivered to an establishment of the second merchant. The courier may then transport the extra inventory to the second merchant. In some instances, the service provider may also facilitate payment by causing funds of an account associated with the second merchant to be transferred to an account associated with the first merchant as payment for the extra inventory.

Further, some implementations herein provide technological innovations that enable inventory orders with a supplier to be coordinated for multiple merchants. For example, a service provider may communicate with various merchants over a network to monitor inventory of items for the merchants. The service provider may direct merchants that utilize a same supplier for an item to place orders for the item at different times. This may assist the supplier in satisfying orders (e.g., avoid shipment delays, etc.) and/or provide the merchants with additional inventory in a timely fashion.

In some implementations of coordinating inventory ordering across merchants, the service provider may designate times for merchants to order inventory with a supplier. For example, the service provider may monitor current inventories of items for merchants and predict when the inventories will reach a threshold lower limit. If it is determined that inventory of a same item for multiple merchants will reach the threshold lower limit around the same time (e.g., within a number of days, weeks, etc. of each other), and that the multiple merchants utilize the same supplier, the service provider may coordinate order placement with the supplier for the multiple merchants. In particular, the service provider may generate an inventory reordering schedule that designates a time for a first merchant to order additional inventory of the item and designates a separate time for a second merchant to order additional inventory of the item. The inventory reordering schedule may include ordering times that are separated by a particular amount, so that the supplier (which provides items to both merchants) is able to keep up with the demand. That is, the inventory reordering schedule may coordinate orders with the supplier, so that the supplier does not receive requests for more than a particular number of items within a given time period. To illustrate, the inventory reordering schedule may indicate that a first merchant should order additional inventory from a supplier on a first Monday of the month and a second merchant should order additional inventory from the same supplier on a fourth Monday of the month.

Based on the inventory reordering schedule, the service provider may cause orders to be placed with the supplier. In some instances, merchants may opt in to automatic ordering, so that an order may be placed on behalf of a merchant at a time that is designated for the merchant. In other instances, the service provider may provide a notification to a merchant as a designated time for the merchant to order approaches. The notification may recommend that the merchant order additional inventory around the designated time. In any event, the service provider may facilitate orders with a supplier for the merchants according to the inventory reordering schedule.

In many instances, the techniques described herein may intelligently control inventory of items for merchants. For example, in cases where excess inventory for a merchant is supplied to another merchant that lacks inventory, the techniques may clear out excess inventory (e.g., and free up space), provide additional capital to the merchant supplying the inventory, and enable the merchant that lacks inventory to receive additional inventory. In addition, in instances where a courier and/or inventory of a proximate merchant are used, the techniques may facilitate delivery of items in a relatively timely manner (e.g., in comparison to deliveries by some suppliers). Further, the techniques may coordinate inventory orders so that orders are placed for an item with a supplier at different times. This may allow the supplier to meet demand for the item (e.g., avoid delayed shipments to merchants).

This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 in which the techniques discussed herein may be implemented. The architecture 100 includes a service provider 102 that communicates with merchants 104, one or more suppliers 106 (hereinafter "the supplier 106"), one or more couriers 108 (hereinafter "the courier 108"), one or more users 110 (hereinafter "the user 110"), one or more bank computing devices 112, and/or one or more card payment network computing devices 114 to perform a variety of processing. For example, the service provider 102 may direct the merchants 104 to supply inventory to each other and/or coordinate inventory orders with the supplier 106. Further, in some instances the service provider 102 may facilitate transactions between buyers and sellers, which may include communicating with the one or more bank computing devices 112 and/or the one or more card payment network computing devices 114. Each of the merchants 104, the supplier 106, the courier 108, and/or the user 110 may be associated with a computing device. As illustrated, any of the computing devices of the architecture 100 may communicate with each other via one or more networks 116.

A merchant may include any business engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. In addition, a buyer (e.g., user) may include any entity that acquires goods or services from a merchant, such as by purchasing, renting, leasing, borrowing, licensing or the like. Hereinafter, goods and/or services may be referred to as items. An item may include a finished product, partially finished product, raw material, and so on. Thus, a merchant and a buyer may interact with each other to conduct a transaction in which the buyer acquires one or more items from a merchant, and in return, the buyer provides payment to the merchant.

A supplier may include any entity engaged in providing items to others. A supplier may generally be involved in moving an item along a supply chain to a customer. For example, a supplier may include a wholesaler, manufacturer, packager, distributor, dealership, and so on. Further, in some instances a merchant may be considered a supplier and vice versa.

A courier may include any entity engaged in delivering an item. In one example, a courier may transport an item from a merchant to a user (e.g., upon purchase of the item by the user from the merchant). In another example, a courier may transport an item from a supplier to a merchant. In yet another example, a courier may transport an item between merchants. Some implementations discussed herein enable people to participate as couriers in a type of crowdsourced service economy. Here, essentially any person with a mobile device is able to immediately become a courier, or cease to be a courier, in a courier network that provides delivery services for delivery of items. For example, a user or a merchant may become a courier.

The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the service provider 102 may direct the merchants 104 to supply inventory to each other. As one example, assume that the merchants 104(1) and 104(n) sell baseball bats and utilize an inventory management application provided by the service provider 102 to manage inventory (e.g., view inventory levels, order inventory, etc.). The service provider 102 may monitor inventory levels of the baseball bats for each of the merchants 104(1) and 104(n) based on transaction information that is received from the merchants 104(1) and 104(n) regarding purchases of baseball bats. In this example, the service provider 102 determines that the inventory of baseball bats for the merchant 104(1) is lacking. The inventory of baseball bats may be lacking due to the current inventory of baseball bats being below a threshold (e.g., below ten baseball bats that are projected to be sold next week), an increase in a sales rate of baseball bats (which might cause the inventory to run out before additional inventory could arrive), a future event that would increase sales of baseball bats (e.g., a world series game in town next week), and so on. Based on this determination, the service provider 102 may send a notification 118 to the merchant 104(1) indicating that the inventory of baseball bats is relatively low and recommending that the merchant 104(1) order additional baseball bats. The notification 118 may be provided in a variety of manners (e.g., displayed via an inventory management application, output via a speaker, sent in an electronic message (text message, email, etc.), discussed in a telephone call, and so on). In this example, the merchant 104(1) places an order with the service provider 102 for twenty baseball bats that are deemed to be similar to the baseball bats currently in inventory (e.g., have more than a particular number of the same characteristics). The merchant 104(1) requests that the baseball bats be delivered the next day, if possible, and specifies a price of $12 per baseball bat (e.g., the top price the merchant 104(1) is willing to pay).

Additionally, the service provider 102 may determine that the merchant 104(n) has extra inventory of baseball bats. For example, it may be determined that the merchant 104(n) has fifty baseball bats sitting in inventory. Based on previous sales rates of baseball bats (e.g., sales history), the service provider 102 may estimate that the merchant 104(n) will sell five baseball bats over the next month. Thus, it may be determined that the merchant 104(n) has extra inventory since the current inventory of baseball bats is more than the estimated number of baseball bats that will be sold over the next month. Alternatively, or additionally, it may be determined that the merchant 104(n) has extra inventory when the current inventory of baseball bats is greater than a predetermined threshold, such as a threshold of twenty that is set by the merchant 104(n) for identifying excess inventory. Based on this information, the service provider 102 may send a notification 120 to the merchant 104(n) indicating that the merchant 104(n) has extra inventory of baseball bats. The notification 120 may ask if the merchant 104(n) would like to sell at least some of the baseball bats. The notification 120 may be provided in a variety of manners (e.g., displayed via an inventory management application, output via a speaker, sent in an electronic message (text message, email, etc.), discussed in a telephone call, and so on). Here, the merchant 104(n) requests that the service provider 102 offer thirty of the fifty baseball bats for sale at a price of $10 per bat. In some instances, the service provider 102 may provide a recommendation regarding a number of the baseball bats that the merchant 104(n) should offer for sale, such as all inventory, a particular percentage of inventory (so that a merchant may retain some inventory), and so on. Based on the request from the merchant 104(n), the service provider 102 may mark the thirty baseball bats as being available for purchase by others.

After receiving the request from the merchant 104(1) for additional baseball bats and/or the offer from the merchant 104(n) to sell baseball bats, the service provider 102 may determine to match up the merchants 104(1) and 104(n). For example, the service provider 102 may determine that the merchant 104(1) is in need of a same type of baseball bat that is being offered for sale by the merchant 104(n). Further, it may be determined that the merchants 104(1) and 104(n) are located within a couple of blocks of each other. Additionally, it may be determined that the merchant 104(n) is offering thirty baseball bats at a cost of $10, which would satisfy the quantity and cost requested by the merchant 104(1) of twenty and $12, respectively. As illustrated by map 122 in FIG. 1, the service provider 102 may determine that merchant A (the merchant 104(1)) is lacking inventory of the baseball bats (illustrated with a stripped bar) and that merchant B (the merchant 104(n)) has extra inventory of the baseball bats (illustrated with a stripped bar). Further, merchants A and B are also shown to be within a particular proximity of each other by the dotted circle. Accordingly, the service provider 102 places an order with the merchant 104(n) for twenty baseball bats at a cost of $10, which may be below a price at which baseball bats are being sold by a supplier.

Although in the example above input is received from the merchants 104(1) and 104(n) to facilitate a delivery of inventory, in some instances the techniques may be performed without receiving input. In one example, the merchant 104(1) may opt in to have the service provider 102 automatically order and delivery items to the merchant 104(1) when inventory reaches a particular level. Here, the notification 118 would not be provided to the merchant 104(1).

Further, in some instances a notification may be provided to a merchant with information about a potential seller or buyer. In one example, the service provider 102 may search for a seller in response to receiving a request from a merchant for additional inventory. Here, the service provider 102 may inform a merchant with extra inventory about a potential buyer (e.g., "We noticed that you have extra inventory. We have found a potential buyer for you. Would you like to sell your extra inventory?"). In another example, the service provider 102 may search for a buyer in response to receiving an offer from a merchant to sell inventory. Here, the service provider 102 may inform a merchant that is lacking inventory about a potential seller (e.g., "It looks like you need more inventory. We have found a potential seller. Would you like to purchase more inventory?").

In any event, the service provider 102 may perform various processing to cause the baseball bats to be delivered to the merchant 104(1). In some instances, the service provider 102 may instruct a courier to transport the baseball bats to an establishment of the merchant 104(1). The service provider 102 may select a courier that is located within a predetermined distance to the merchant 104(n) (and/or the merchant 104(1)). It may be determined that the courier is located within the predetermined distance based on a location of an establishment for the courier (e.g., a company building for the courier), a location of a computing device associated with the courier, and so on. In some examples, the service provider 102 manages a plurality of couriers by arranging deliveries for the couriers. The couriers may be users participating as couriers (e.g., crowdsourced couriers), and so on. As such, the service provider 102 may track locations of couriers. The service provider 102 may instruct a selected courier to transport the baseball bats from an establishment of the merchant 104(n) to an establishment of the merchant 104(1). The service provider 102 may provide information regarding a number of items to transport, locations of merchants, requested time of pickup and/or delivery, and so on. In the architecture 100 of FIG. 1, a notification 124 is provided to the courier 108 to instruct the courier 108 to make the delivery. If it is determined that multiple trips are required to deliver the baseball bats (e.g., due to a number of items being delivered, a size of items being delivered, a carrying capacity of a courier, etc.), the service provider 102 may inform a courier of the multiple trips and/or send instructions to multiple couriers to make the delivery. Further, the service provider 102 may let a courier know that a delivery that is not urgent may be performed during a downtime period during which less than a threshold number of deliveries are scheduled for the courier. The service provider 102 may inform the courier of the time period (e.g., "perform the delivery between 8 pm and 10 pm any night this week") or the courier may make the delivery as time frees up throughout a day, week, etc.

Alternatively, or additionally, the service provider 102 may cause the baseball bats to be delivered by instructing one of the merchants 104(1) or 104(n) to facilitate the delivery. In one example, the service provider 102 may send a notification to the merchant 104(n) with information about a number of bats being requested for shipment, an address to ship the baseball bats to (e.g., address of the merchant 104(1)), and so on. The merchant 104(n) may contact the merchant 104(1) to exchange the baseball bats and/or enlist a local courier (e.g., contact the local courier, take the baseball bats to a facility of the local courier, etc.). In another example, the service provider 102 may contact the merchant 104(1) to facilitate the delivery (e.g., provide contact information for the merchant 104(n)). In some instances, the merchant 104(1) may not know that the baseball bats are being provided by a merchant, but may assume that the baseball bats originate from a supplier. To illustrate, the baseball bats may be delivered in a box by a mail carrier in a manner similar to how a delivery would be made for a supplier. In FIG. 1, one or more items 126 represent the baseball bats being transported from the merchant 104(n) to the merchant 104(1).

In some instances, the service provider 102 may cause payments to be made to a merchant and/or a courier. For example, the service provider 102 may cause funds from an account associated with the merchant 104(1) to be transferred to an account associated with the merchant 104(n) as payment for the baseball bats. Further, funds may be transferred from the merchant 104(1) (or the merchant 104(n) in some instances) to an account associated with the courier 108 for delivering the baseball bats. Payment may additionally be made to the service provider 102 for facilitating the transaction. To illustrate, a $1 payment per baseball bat may be made to the courier 108 and a $1 payment per baseball bat may be made to the service provider 102. In sum, the total price paid by the merchant 104(1) may be $12 per bat ($10 paid to the merchant 104(n), $1 paid to the courier 108, and $1 paid to the service provider 102), which is still below the requested price of $12. In other illustrations, any amount of payment may be made to the parties.

Further, as noted above the service provider 102 may perform processing to coordinate inventory orders with a supplier. As one example, the service provider 102 may monitor inventory of soccer balls that are sold by the merchants 104(1) and 104(n). The service provider 102 may determine that the merchant 104(1) (merchant A) sells ten soccer balls a week and currently has twenty soccer balls in stock. The service provider 102 may also determine that the merchant 104(n) (merchant B) sells five soccer balls a week and currently has fifteen soccer balls in stock. Based on previous orders, the service provider 102 may determine that the merchants 104(1) and 104(n) order additional soccer balls when inventory reaches ten soccer balls. Accordingly, the service provider 102 may determine that the inventory of soccer balls for the merchant 104(1) and the inventory of soccer balls for the merchant 104(n) will reach ten soccer balls around the same time next week (e.g., same day, within a couple days of each other, etc.). As illustrated in FIG. 1 at 128, the inventory of soccer balls for the merchant 104(1) (illustrated with a line labeled "A") and the inventory of soccer balls for the merchant 104(n) (illustrated with a line labeled "B") will reach a threshold (labeled "Th.") around a same time. Further, the service provider 102 determines that the merchants 104(1) and 104(n) utilize the same supplier for soccer balls. This would result in the merchants 104(1) and 104(n) ordering soccer balls on around a same time from the same supplier. Accordingly, based on this information, the service provider 102 may coordinate inventory orders of soccer balls for the merchants 104(1) and 104(n).

To coordinate inventory orders, the service provider 102 may generate an inventory reordering schedule 130. The inventory reordering schedule 130 may specify times for reordering inventory across multiple merchants. For example, the inventory reordering schedule 130 may specify a time 132 for the merchant 104(n) to order additional soccer balls and a time 134 for the merchant 104(1) to order additional soccer balls. The time 132 may be different than a time at which the merchant 104(n) would ordinarily order additional inventory (e.g., well in advance of the inventory reaching the threshold lower limit), whereas the time 134 may be at a normal time at which the merchant 104(1) would ordinarily order additional inventory. The time 132 may be separated enough from the time 134 (e.g., more than a particular amount), so that a supplier may replenish stock of soccer balls between receiving inventory orders. Further, the time 132 and/or the time 134 may be before the associated inventory for the respective merchant reaches a threshold lower limit (or at a time when it reaches the threshold lower limit). Additionally, or alternatively, the inventory reordering schedule 128 may specify a quantity of items for a particular merchant to order. As such, the inventory reordering schedule 130 may cause merchants to order at regular intervals (e.g., that are offset from each other), order more frequently (e.g., and with less quantity) than previous orders by the merchants, order less frequently (e.g., and with more quantity) than previous orders by the merchants, and so on.

In many instances, the inventory reordering schedule 130 may be generated when it is determined that multiple merchants will likely order additional inventory around a same time. In other instances, the inventory reordering schedule 130 may be generated without such determination. For example, the service provider 102 may determine that two merchants utilize a same supplier for a particular item. Here, the service provider 102 may generate the inventory reordering schedule 130 for the merchants without determining whether or not inventory will run out around the same time.

Based on the inventory reordering schedule 130, the service provider 102 may cause inventory orders to be placed for merchants. In one example, a merchant may opt in for automatic ordering (e.g., send a request to the service provider 102 to place orders on behalf of the merchant). Here, the service provider 102 may determine that a designated time for ordering inventory for the merchant is approaching (e.g., a current time is within a widow of time to the designated time), and automatically order additional inventory for the merchant. The service provider 102 may determine a number of items to order based on previous input from the merchant, a quantity ordered in a previous purchase, and so on. In another example, the service provider 102 may determine that a time designated for ordering inventory for a merchant is approaching and send a notification to the merchant requesting authorization (or recommending) to order additional inventory. The merchant may reply with a request for the additional inventory. In any event, an order may be placed with a supplier, a merchant, or others according to the inventory reordering schedule 130. In the example of FIG. 1, an order is placed with the supplier 106 and additional inventory is provided to the merchants 104 as one or more items 136. In some instances, a discount may be offered to a merchant that orders according to the inventory reordering schedule 130, such as a reduced value for an order, a credit, etc.

As noted above, the service provider 102 may communicate with the one or more card payment network computing devices 114 to conduct a transaction electronically. The one or more card payment network computing devices 114 may be associated with a card payment network (e.g., MasterCard®, VISA®, etc.). The service provider 102 may also communicate with the one or more bank computing devices 112 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

As noted above, one or more computing devices of the architecture 100 may communicate via the one or more networks 116. The one or more networks 116 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 116 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 116 in any manner, such as by a wired or wireless connection.

Although many techniques are described herein as being performed by a particular device, any number of the techniques may be performed by other devices. For example, techniques described as being performed by the service provider 102, may be performed locally at a computing device of one of the merchants 104, the supplier 106, the courier 108, and/or the user 110.

Figure 2:
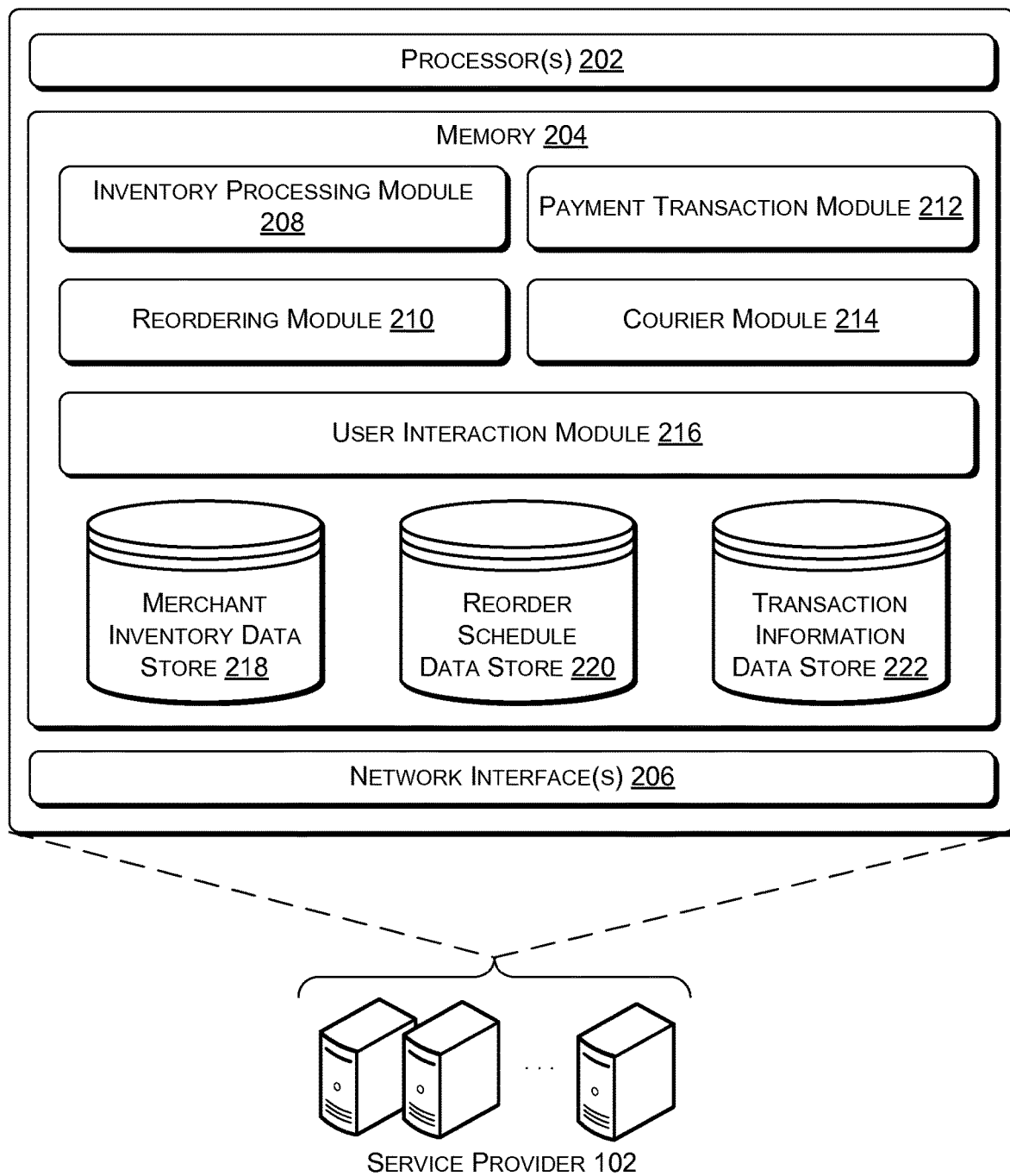
FIG. 2 illustrates example details of a service provider.

FIG. 2 illustrates example details of the service provider 102 of FIG. 1. As noted above, the service provider 102 may be implemented as one or more computing devices. The one or more computing devices may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

The memory 204 (as well as all other memory described herein, including memory of a merchant device, a courier device, a user device, and so on) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

As illustrated, the memory 204 may include an inventory processing module 208, a reordering module 210, a payment transaction module 212, a courier module 214, and a user interaction module 216.

The inventory processing module 208 may manage inventories of items for merchants. The inventory processing module 208 may receive initial information identify an inventory of an item and, thereafter, update the inventory of the item as transaction information is received. Further, in some instances the inventory management module 208 may communicate with a third party service to identify inventory levels for merchants. Information describing inventories of items may be stored in a merchant inventory data store 218.

The inventory processing module 208 may also facilitate inventory distributions between merchants. For example, the inventory processing module 208 may perform various operations described herein to cause inventory of one merchant to be transferred to another merchant. In general, the inventory processing module 208 may determine when a merchant has extra inventory, when a merchant lacks inventory, and/or when to cause inventory to be transferred between merchants.

The reordering module 210 may coordinate inventory orders across merchants. To do so, the reordering module 210 may generate one or more inventory reordering schedules that designate times for ordering inventory, quantities of inventory to order, and so on. An inventory reordering schedule may be specific to a particular context, such as a particular supplier, item, merchant, etc. In one example, an inventory schedule may specify times for various merchants to order inventory from a supplier for a particular item. As such, separate inventory reordering schedules may exist for different items offered by the supplier. In some instances, an inventory reordering schedule is based on an amount of time for a supplier to replenish an item (e.g., restock, manufacture the item, etc.). The reordering module 210 may store one or more inventory reordering schedules in a reorder schedule data store 220.

The payment transaction module 212 may facilitate transactions between merchants and users. During a transaction, a user (e.g., customer) may acquire an item from a merchant by purchasing, renting, leasing, borrowing, licensing, or the like. An item may refer to a good and/or a service offered by merchants. The payment transaction module 212 may be configured to enable electronic payments for transactions. In some instances, the service provider 102 may include one or more computing devices that are configured to perform secure electronic financial transactions between merchants and users through, for example, data communicated between a user device and a merchant device. When paying for a transaction, a user can provide the amount of payment that is due to a merchant using cash, check, a payment card, NFC, or by electronic payment. The merchant may interact with a merchant device to process the transaction at a point of sale (POS) (e.g., the place where the user meets with the merchant). Further, the transaction may be processed by electronically transferring funds from a financial account associated with a user account for the user to a financial account associated with a merchant account for the merchant. During the transaction, the merchant device can determine and send data describing the transaction, including, for example, appointment data, services related to and/or provided, item(s) being purchased, the amount of the item(s), buyer information, and so forth.

The payment transaction module 212 may store transaction information in a transaction information data store 222. The transaction information may include information regarding the time, place and/or the amount of the transaction, information related to the item acquired (e.g., information identifying the item sold), a type of payment being used (e.g., cash, check, payment card, electronic payment, etc.), as well as additional information, such as buyer information. For instance, if a payment card is used, the transaction information can include data stored in the payment card (e.g., Track 1 data (cardholder name, card number and other card information)). In addition, when completing the transaction a buyer may sometimes provide a receipt email address for receiving a receipt through email. Other examples of transaction information that can be captured include item information (e.g., an itemized listing of the items being acquired, the price being paid for each item, descriptors of the items (size, flavor, color, etc.), geolocation data indicating a geographic POS location of a particular transaction, online/offline card data, data describing the merchant (e.g., a merchant identifier, a merchant category code (MCC), etc.), any type of data that is received upon a buyer's authentication into a social network, if any, and various other types of information.

In some implementations, the payment transaction module 212 enables card-less payments (e.g., electronic payments) for transactions between user and merchants based on interaction of the user with a user device and interaction of the merchant with a merchant device. Accordingly, in some examples, a card-less payment transaction may include a transaction conducted at a POS location during which an electronic payment account of the user is charged without the user having to physically present a payment card to the merchant at the POS location. Consequently, the merchant need not receive any details about the financial account of the user for the transaction to be processed. As one example, the electronic payment may be charged to a credit card issuer or credit card number that the user provided when signing up with the service provider 102 for an electronic payment account. As another example, the user may have a quantity of money pre-paid in an account maintained for use in making the electronic payments. Other variations will also be apparent to those of skill in the art having the benefit of the disclosure herein.

The courier module 214 may arrange deliveries for couriers. The courier module 214 may generally select a courier for a delivery and communicate with the courier for the delivery. For example, the courier module 214 may select a courier to transport an item from a seller to a buyer based on a location of the courier relative to the seller and/or the buyer. In some instances, the courier module 214 may track locations of couriers (e.g., when users or merchants act as couriers managed by the service provider 102, when the service provider 102 is associated with a courier service, etc.). To illustrate, the courier module 214 may track locations of the couriers before, during, and after a delivery based on location information received from associated courier devices (e.g., mobile devices). Further, in some instances the courier module 214 may manage the couriers through activation, movement, positioning, and/or deactivation of the couriers. A courier may deliver items to merchants, suppliers, users, and so on.

The inventory processing module 208, the reordering module 210, the payment transaction module 212, and/or the courier module 214 may operate in cooperation with the user interaction module 216 to handle communications with merchants, users, and/or couriers. For example, the user interaction module 216 may operate in accordance with instructions from the inventory processing module 208 to request or provide information on behalf of the inventory processing module 208. The user interaction module 216 may send communications to computing devices and/or facilitate user interfaces via the computing devices, such as an inventory management interface, payment processing interface, and so on. In one example, the user interaction module 216 sends electronic messages to merchants, users, and/or couriers, such as text messages, emails, posts to social media sites, and so on. In some instances, communications from merchants, users, and/or couriers may be processed using natural language processing techniques.

While FIG. 2 illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

Figure 3:
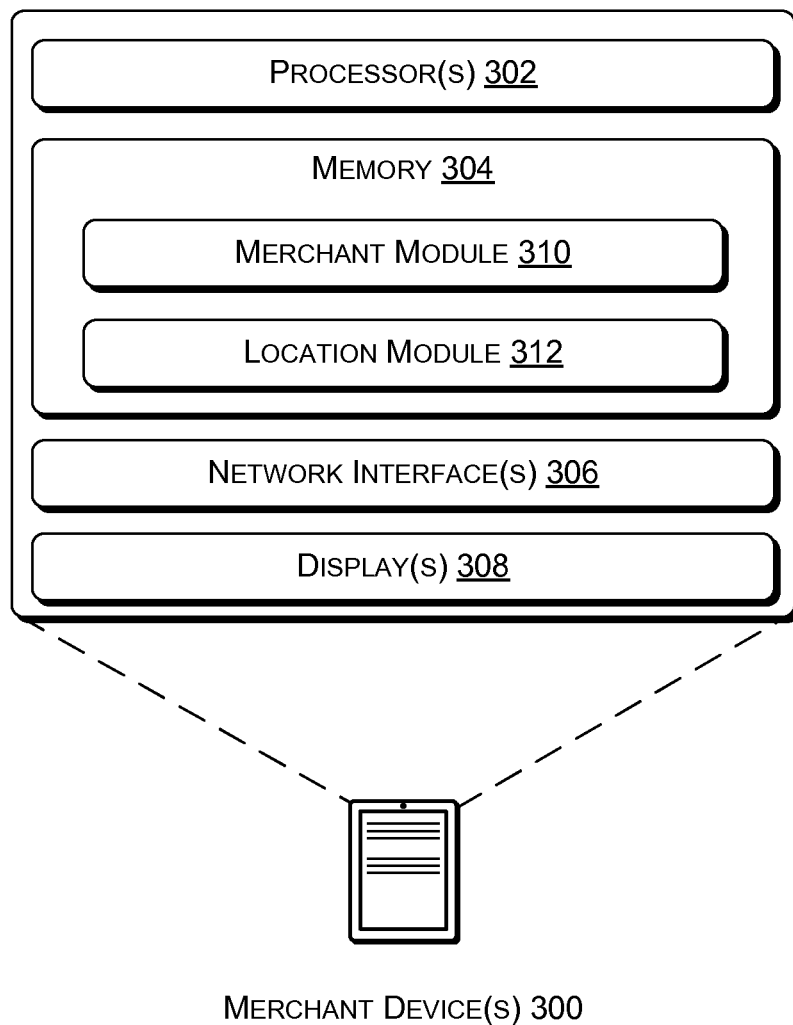
FIG. 3 illustrates example details of a merchant device.

FIG. 3 illustrates example details of a merchant device 300. The merchant device 300 may be employed by a merchant of the merchants 104 of FIG. 1. The merchant device 300 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the merchant device 300 may be a mobile device.

The merchant device 300 may include one or more processors 302, memory 304, one or more network interfaces 306, and one or more displays 308. The one or more processors 302 may include a central processing unit (CPU), a graphics processing unit (GPU), a microprocessor, a digital signal processor, and so on. The one or more displays 308 may include a touch screen, a Liquid-crystal Display (LCD), a Light-emitting Diode (LED) display, an organic LED display, a plasma display, an electronic paper display, or any other type of technology. Although not illustrated, the merchant device 300 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The merchant device 300 may additionally include, or be associated with, input device(s) such as a keyboard, a mouse, a pen, a voice input device, a touch input device, etc. The memory 304 may include a merchant module 310 and a location module 312.

The merchant payment module 310 (e.g., merchant application) may perform various processes to assist a merchant in processing transactions with customers, managing inventory, and so on. The merchant payment module 310 may provide various interfaces and/or dashboards. In one example, the merchant payment module 310 may facilitate transactions with customers by accepting payment from customers (e.g., via a card reader, NFC connection to a customer device, Bluetooth® connection to customer device, etc.), providing receipts for items (including printing receipts), receiving input from customers for items being acquired by the customers (e.g., confirmation, signature for credit card, etc.), and so on. In another example, the merchant payment module 310 may enable a merchant to manage inventory by informing the merchant of inventory levels (e.g., number of items currently in-stock), order additional inventory, view notifications from the service provider 102 regarding inventory, offer inventory for acquisition to others, seek financing for inventory, and so on. In yet another example, the merchant payment module 310 may provide data analytics for sales, inventory, or other information. In some instances, an interface may be provided to a customer to facilitate a transaction (e.g., an interface to confirm payment, provide a signature, etc.), manage inventory, view analytics data, and so on. The merchant payment module 310 may communicate with the service provider 102 to facilitate a variety of functionality (e.g., any components of the service provider 102).

The location module 312 may determine a location of the merchant device 300. In some instances, the location is provided to the service provider 102, or used locally, to facilitate various functions, such as processing of transactions when a customer is located within a particular proximity to the merchant device 300. The location module 312 may determine a geographic location of the merchant device 300 from geolocation techniques (e.g., satellite-based systems—global positioning system (GPS)), cell tower location data, wireless access point location data, wireless beacon location, and so forth. As such, the location module 312 may utilize data from a location sensor of the merchant device 300, such as a GPS receiver or communication interface that can determine (e.g., from cell towers or wireless access points) a geographic location of the merchant device 300.

In some types of businesses, the merchant device 300 may be associated with a store or other place of business of a merchant, and thus, may be a fixed location that typically does not change on a day-to-day basis. In other types of businesses, however, the merchant device 300 may move locations from time to time, such as in the case where the merchant operates a food truck, is a street vendor, a cab driver, etc. or has an otherwise mobile business (e.g., in the case of merchants who sell items at buyer's homes, places of business and so forth).

Figure 4:
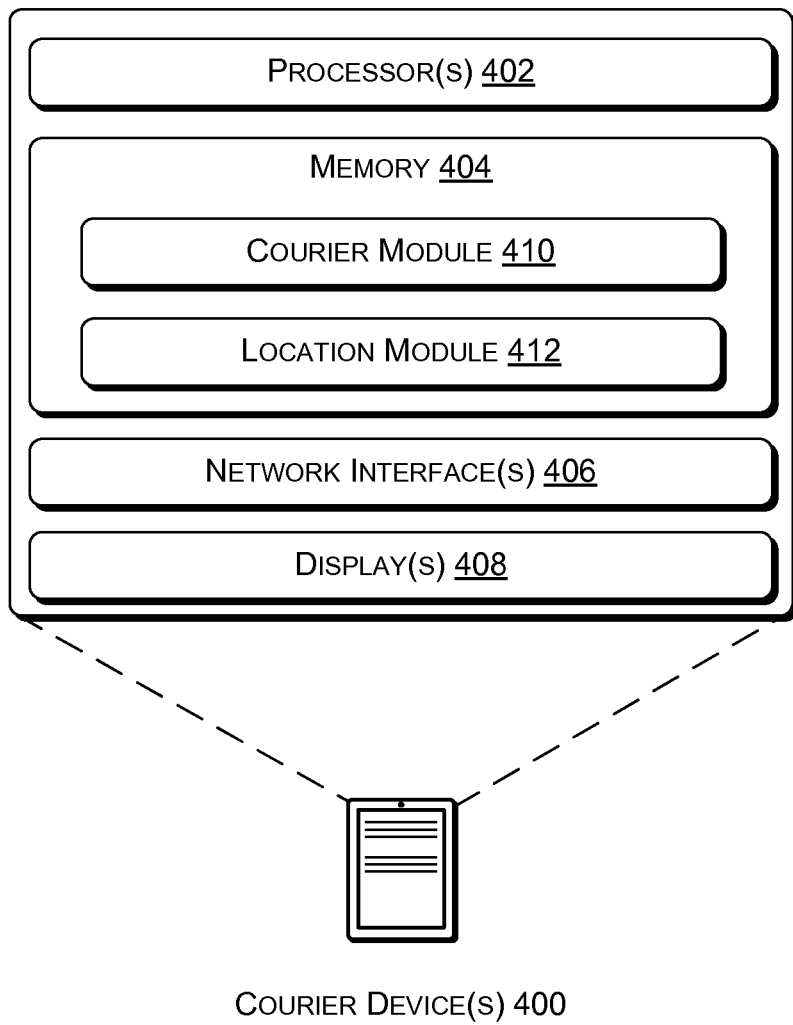
FIG. 4 illustrates example details of a courier device.

FIG. 4 illustrates example details of a courier device 400. The courier device 400 may be employed by the courier 108 of FIG. 1. The courier device 400 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the courier device 400 may be a mobile device.

The courier device 400 may include one or more processors 402, memory 404, one or more network interfaces 406, and one or more displays 408. The one or more processors 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the courier device 400 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The courier device 400 may additionally include, or be associated with, input device(s) such as a keyboard, a mouse, a pen, a voice input device, a touch input device, etc. The memory 404 may include a courier module 410 and a location module 412.

The courier module 410 (e.g., courier application) may receive order information from the service provider 102 to provide a courier with information for picking up a particular order from a merchant's pickup location and/or for delivering the order to a buyer delivery location. The courier module 410 may further enable the courier to respond to the service provider 102 to confirm acceptance of a delivery job. In some cases, the courier module 410 may facilitate the courier to become active or inactive (e.g., in cases where users are used as couriers). For example, the courier application 410 may be periodically pinged by the service provider 102 to determine interest in becoming active and, if so, requesting current location information of the associated courier. A courier who is interested in being activated may respond with location information, while a courier who is not interested in being activated may keep location information private by not responding.

The location module 412 may determine a location of the courier device 400. In some instances, the location is provided to the service provider 102, or used locally, to facilitate various functions. The location module 412 may determine a geographic location of the courier device 400 from geolocation techniques (e.g., satellite-based systems—global positioning system (GPS)), cell tower location data, wireless access point location data, wireless beacon location, and so forth. As such, the location module 412 may utilize data from a location sensor of the courier device 400, such as a GPS receiver or communication interface that can determine (e.g., from cell towers or wireless access points) a geographic location of the courier device 400.

Figure 5:
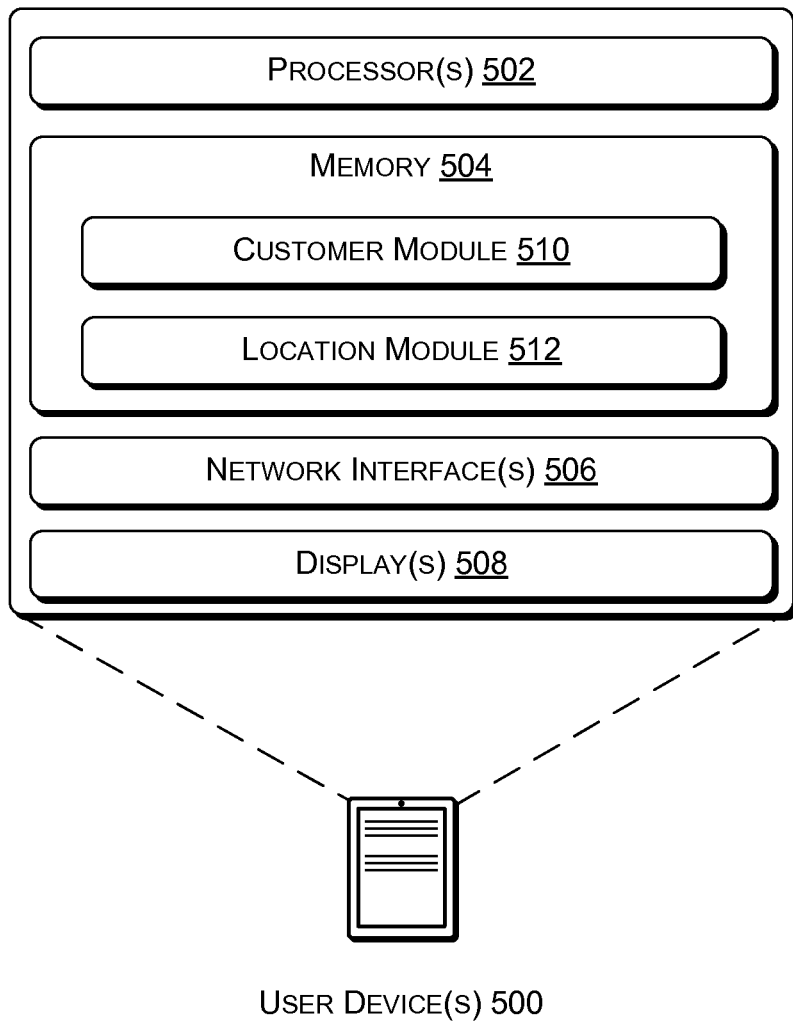
FIG. 5 illustrates example details of a user device.

FIG. 5 illustrates example details of a user device 500. The user device 500 may be employed by the user 110 of FIG. 1. The user device 500 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the user device 500 may be a mobile device.

The user device 500 may include one or more processors 502, memory 504, one or more network interfaces 506, and one or more displays 508. The one or more processors 502 may include a central processing unit (CPU), a graphics processing unit (GPU), a microprocessor, a digital signal processor, and so on. The one or more displays 508 may include a touch screen, a Liquid-crystal Display (LCD), a Light-emitting Diode (LED) display, an organic LED display, a plasma display, an electronic paper display, or any other type of technology. Although not illustrated, the user device 500 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The user device 500 may additionally include, or be associated with, input device(s) such as a keyboard, a mouse, a pen, a voice input device, a touch input device, etc. The memory 504 may include a customer module 510 and a location module 512.

The customer module 510 may provide functionality to enable a user to order an item and/or process a transaction for the item. The customer module 510 may provide various interfaces and/or dashboards. For example, the customer module 510 may provide information via an interface regarding merchants that are within a predetermined proximity to a user. The user may select a merchant and order an item with the merchant. Additionally, or alternatively, the customer module 510 may enable the user to provide payment for an item (e.g., via a card reader, NFC connection to a merchant device, Bluetooth® connection to a merchant device, etc.), receive receipts for items, and so on. Further, the customer module 510 may enable the user to check in to a merchant to carry out a card-less payment transaction. Moreover, the customer module 510 may provide a variety of other functionality to order an item and/or process a transaction.

The location module 512 may determine a location of the user device 500. In some instances, the location is provided to the service provider 102, or used locally, to facilitate various functions, such as processing of transactions when a customer is located within a particular proximity to a merchant device. The location module 512 may determine a geographic location of the user device 500 from geolocation techniques (e.g., satellite-based systems—global positioning system (GPS)), cell tower location data, wireless access point location data, wireless beacon location, and so forth. As such, the location module 512 may utilize data from a location sensor of the user device 500, such as a GPS receiver or communication interface that can determine (e.g., from cell towers or wireless access points) a geographic location of the user device 500.

Although not illustrated a supplier device associated with a supplier (e.g., the supplier 106) may include any type of computing device, such as any of the computing devices mentioned herein (e.g., the merchant device 300, the courier device 400, and/or the user device 500). Further, the supplier device may include any components of such computing devices.

FIGS. 6-11 illustrate example processes 600, 700, 800, 900, 1000, and 1100 for employing the techniques described herein. For ease of illustration the processes 600, 700, 800, 900, 1000, and 1100 may be described as being performed by a computing device described herein, such as the service provider 102, the merchant device 300, the courier device 400, and/or the user device 500. However, the processes 600, 700, 800, 900, 1000, and 1100 may be performed by other devices. Moreover, the devices may be used to perform other processes.

The processes 600, 700, 800, 900, 1000, and 1100 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

Figure 6:
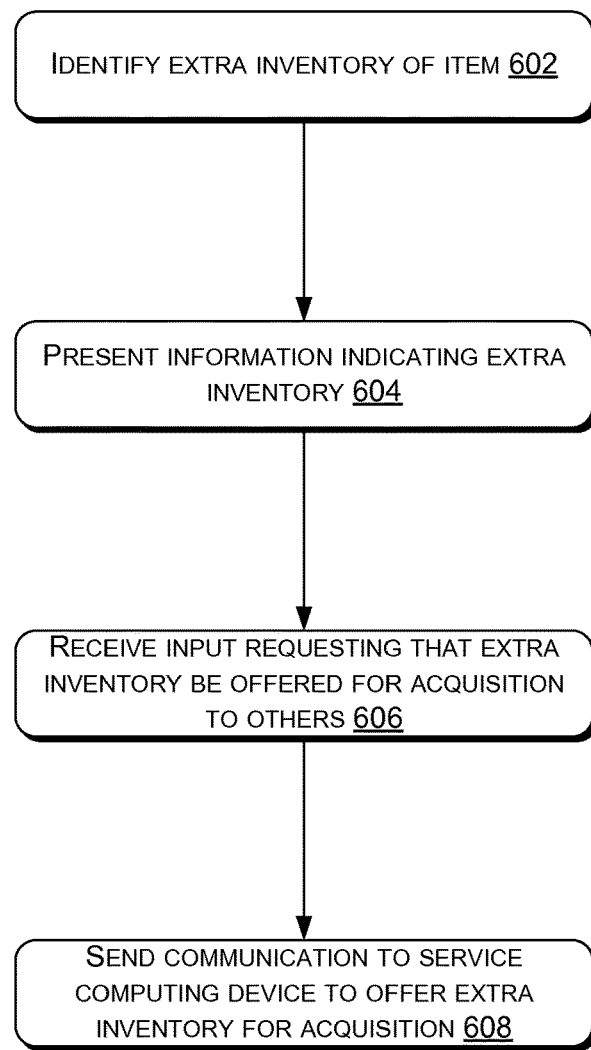
FIG. 6 illustrates an example process to communicate with a merchant regarding extra inventory of an item for the merchant and to cause the extra inventory to be offered for acquisition.

FIG. 6 illustrates the example process 600 to communicate with a merchant regarding extra inventory of an item for the merchant and cause the extra inventory to be offered for acquisition.

At 602, the merchant device 300 (e.g., a merchant application of the merchant device 300) may identify extra inventory of an item. In one example, the merchant device 300 may send transaction information to a service computing device (e.g., the service provider 102) to update inventory lists that are managed by the service computing device. When the service computing device identifies extra inventory of an item for a merchant associated with the merchant device 300, the service computing device may send a communication indicating such extra inventory of the item. In another example, the merchant device 300 may identify extra inventory of an item by determining that inventory of the item is above an inventory threshold, that a number of items in the inventory is more than an estimated number of items to be sold (e.g., over a future period of time), and/or that a least a portion of the inventory of the item has remained at an establishment of the merchant for more than a predetermined amount of time (e.g., a predetermined number of days, weeks, months, etc.).

At 604, the merchant device 300 may present information indicating that the merchant has extra inventory of the item. The information may be presented via a display, a speaker, and so on. In some instances, the information is displayed via a merchant interface that facilitates the management of inventory (e.g., an interface that enables the merchant to view inventory quantities, order additional inventory, etc.). The information may inform the merchant of a number of items of the extra inventory and a number of days, weeks, months, etc. that the items have remained with the merchant. Additionally, or alternatively, the information may identify a number of sales of the item over a last day, week, month, etc. so that the merchant may understand how the item has been selling.

At 606, the merchant device 300 may receive input from the merchant requesting that the extra inventory be offered for acquisition to others (e.g., other merchants). In some instances, the input may specify a cost at which the extra inventory may be offered for acquisition to others and/or a number of items that the merchant is willing to part with (e.g., sell to others).

At 608, the merchant device 300 may send a communication to the service computing device to offer at least a portion of the extra inventory of the item for acquisition to others (e.g., to allow others to purchase items from the merchant). In some instances, the communication may specify a cost at which items may be offered for acquisition to others and/or a number of items that the merchant is willing to part with (e.g., sell to others).

Figure 7:
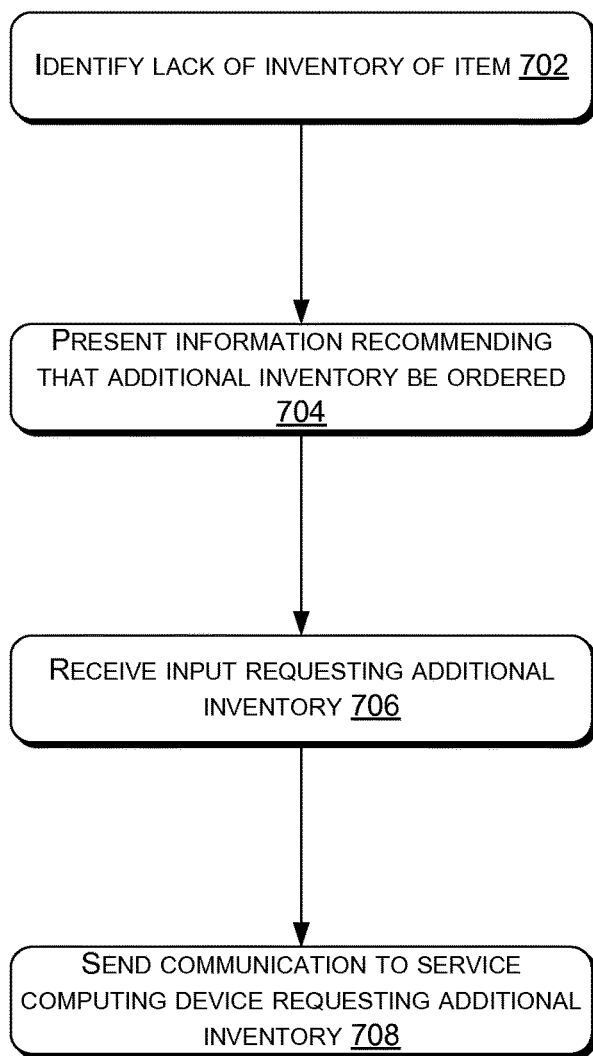
FIG. 7 illustrates an example process to communicate with a merchant regarding a lack of inventory of an item and to request additional inventory of the item.

FIG. 7 illustrates the example process 700 to communicate with a merchant regarding a lack of inventory of an item and request additional inventory of the item.

At 702, the merchant device 300 (e.g., a merchant application of the merchant device 300) may identify a lack of inventory of an item. In one example, the merchant device 300 may send transaction information to a service computing device (e.g., the service provider 102) to update inventory lists that are managed by the service computing device. When the service computing device identifies a lack of inventory of an item for a merchant associated with the merchant device 300, the service computing device may send a communication indicating such lack of inventory of the item. In another example, the merchant device 300 may identify a lack of inventory of an item by determining that inventory of the item is below an inventory threshold and/or that a number of items in the inventory is less than an estimated number of items to be sold (e.g., over a future period of time).

At 704, the merchant device 300 may present information recommending that additional inventory be ordered. The information may be presented via a display, a speaker, and so on. In some instances, the information is displayed via a merchant interface that facilitates the management of inventory. The information may inform the merchant of a number of items currently in inventory, a predicted time when the inventory will reach a threshold lower limit (e.g., based on a sales rate of an item), and so on.

At 706, the merchant device 300 may receive input from the merchant requesting additional inventory of the item (e.g., a request to purchase items, a request to find items for the merchant to purchase, etc.). In some instances, the input may specify a cost at which an item is being requested (e.g., a desired purchase price), a number of items that the merchant is interested in acquiring, a characteristic about an item (e.g., a brand of an item, a type of material that an item is made of, etc.), a time by which shipment of an item is expected to arrive at the merchant's location, or any other information that may be useful in placing an order.

At 708, the merchant device 300 may send a communication to the service computing device requesting additional inventory of the item. The communication may request that the service computing device acquire the additional inventory of the item if found or request that the merchant be informed of items that satisfy the merchant's request. In some instances, the communication may specify a desired purchase cost, a number of items that the merchant is interested in acquiring, a characteristic about an item, an expected arrival date of items to the merchant, or any other information that may be useful in placing an order.

Figure 8:
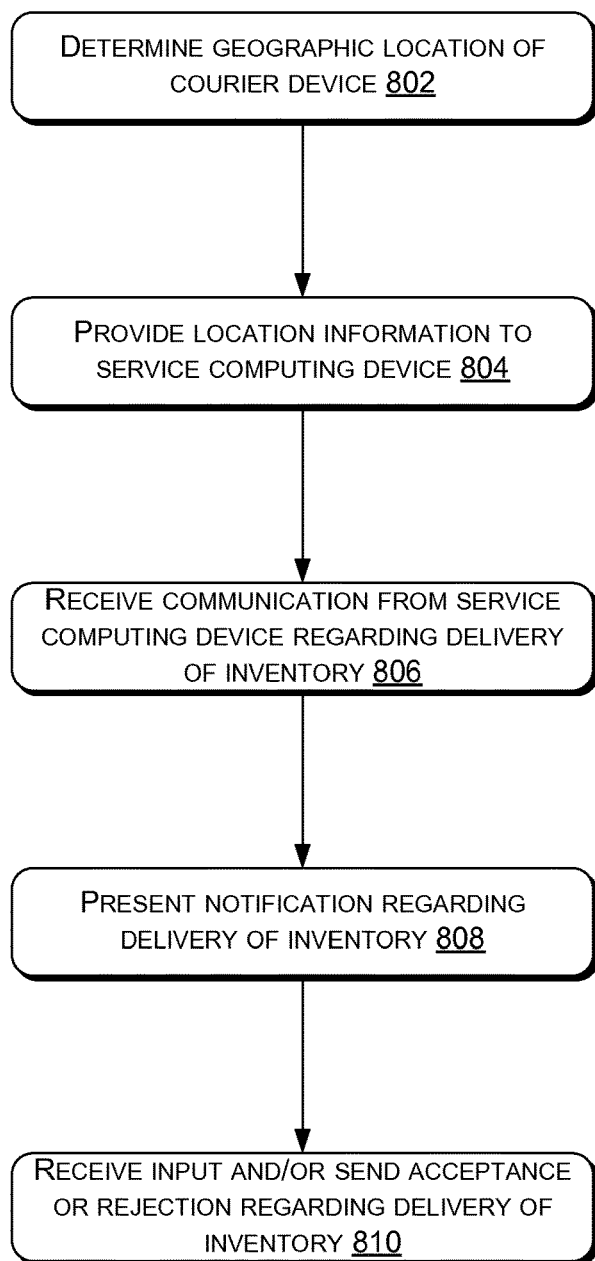
FIG. 8 illustrates an example process to communicate with a courier regarding a delivery of items between merchants.

FIG. 8 illustrates the example process 800 to communicate with a courier regarding a delivery of items between merchants.

At 802, the courier device 400 (e.g., courier application of the courier device 400) may determine a geographic location of the courier device 400. The geographic location may be determined based on data from a location sensor of the courier device 400, such as a satellite-based sensor (e.g., Global Position System (GPS), cell tower radio, wireless access point radio, wireless beacon location sensor, and so forth).

At 804, the courier device 400 may provide location information to a service computing device (e.g., the service provider 102). The location information may indicate the geographic location of the courier device 400. The location information may be provided periodically, at a particular time, upon request, and so on.

At 806, the courier device 400 may receive a communication from the service computing device regarding delivery of inventory. For example, the communication may include a request for a courier associated with the courier device 400 to obtain items from a first merchant and transport the items to a second merchant. The request may specify a time frame for the delivery (e.g., a delivery time), a number of items to delivery, a route of delivery, a location(s) of a merchant, or any other information that may be useful in making the delivery.

At 808, the courier device 400 may present a notification regarding delivery of inventory (e.g., a request for a delivery). The notification may be presented via a display, a speaker, and so on. In some instances, the information is displayed via a courier interface that facilitates deliveries of items (e.g., an interface that enables the courier to accept deliveries, acknowledge that deliveries have been made, request additional deliveries, etc.). The information may present any information that is included in the communication that is received at operation 806. For example, the notification may request that extra inventory of an item be obtained from an establishment of a first merchant and transported to an establishment of a second merchant.

At 810, the courier device 400 may receive input from the courier and/or send acceptance or rejection regarding delivery of inventory. For example, if the input indicates that the courier accepts a task of delivering items to a merchant, the courier device 400 may send a communication to the service computing device indicating that such task has been accepted.

Figure 9A:
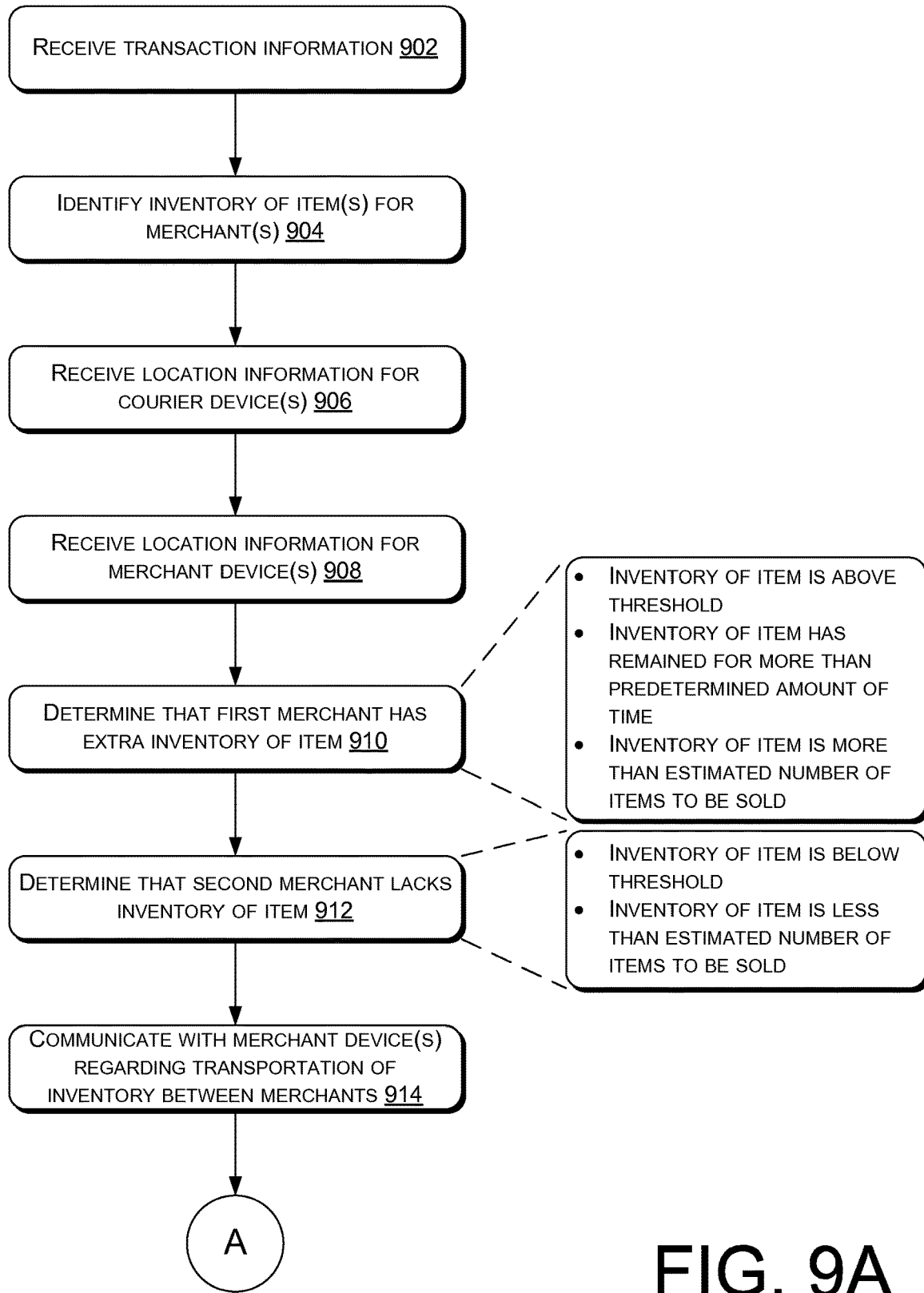
FIGS. 9A and 9B illustrate an example process to distribute items between merchants using existing inventory of a merchant.
Figure 9B:
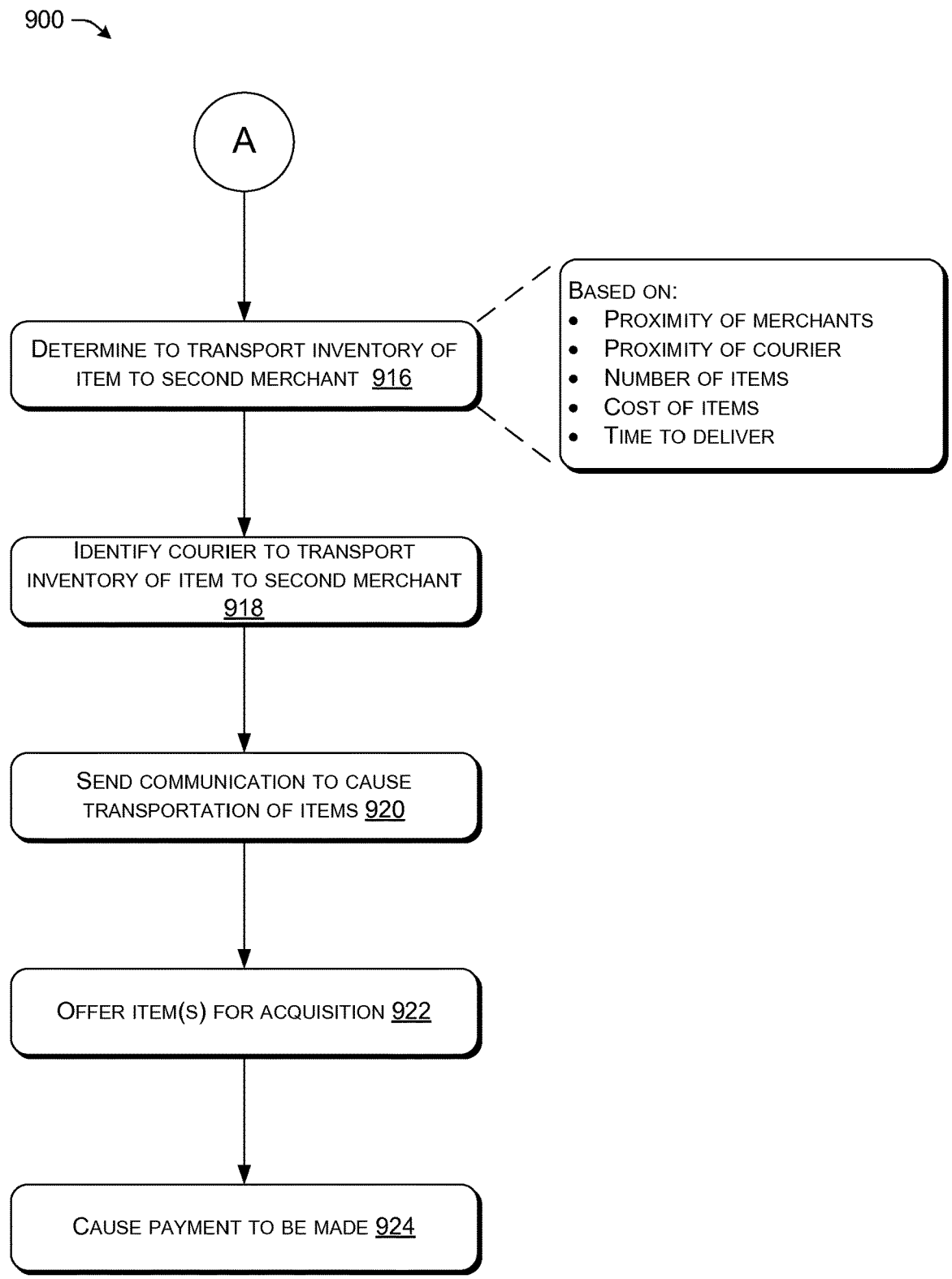

FIGS. 9A and 9B illustrate the example process 900 to distribute items between merchants using existing inventory of the merchants.

In FIG. 9A, at 902 the service provider 102 may receive transaction information from individual ones of a plurality of merchant devices that are associated with individual ones of a plurality of merchants.

At 904, the service provider 102 may identify inventory of one or more items for one or more merchants. In some instances, the service provider 102 may manage and/or monitor inventory for merchants by receiving information about initial inventory levels and updating the inventory levels as transaction information is received. In other instances, the service provider 102 may receive information from a merchant device and/or a third party (e.g., inventory management service) indicating an inventory of an item for the merchant.

At 906, the service provider 102 may receive location information for one or more courier devices. The location information may identify one or more geographic locations of the one or more courier devices. Based on the location information, the service provider 102 may track locations of associated couriers.

At 908, the service provider 102 may receive location information for one or more merchant devices. The location information may identify one or more geographic locations of the one or more merchant devices. Based on the location information, the service provider 102 may track locations of associated merchants.

At 910, the service provider 102 may determine that a first merchant has extra inventory of an item. This may include determining that inventory of the item for the first merchant is above an inventory threshold (e.g., more than a particular number of items), that a number of items in the inventory of the item for the first merchant is more than an estimated number of items to be sold by the first merchant over a future period of time, that a least a portion of the inventory of the item for the first merchant has remained at an establishment of the first merchant for more than a predetermined amount of time (e.g., a number of days, weeks, months, etc.), that a sales rate of the item over a period of time (e.g., a last 30 days) is less than a threshold rate, and so on. The number of items to be sold by the first merchant over the future period of time may be estimated based on a current sales rate of the item for the first merchant, a previous sales rate of the item for the first merchant, a predicted future increase/decrease in a sales rate of the item (e.g., due to an event that will be occurring next week, such as a concert), and so on. In many instances, operation 910 may seek to determine inventory that is not being used by the first merchant (e.g., and is not likely to be used).

At 912, the service provider 102 may determine that a second merchant lacks inventory of an item. This may include determining that the inventory of the item for the second merchant is below an inventory threshold (or will be below the inventory threshold by a particular future time). In another example, the service provider 102 may determine a lack of inventory due to a number of items in the inventory of the item for the second merchant being less than an estimated number of items to be sold by the second merchant over a future period of time. The number of items to be sold by the second merchant over the future period of time may be estimated based on a current sales rate of the item for the second merchant, a previous sales rate of the item for the second merchant, a predicted future increase/decrease in a sales rate of the item (e.g., due to an event that will be occurring next week, such as a concert), and so on. The future period of time over which sales are estimated for the second merchant may different than (e.g., shorter than or longer than) the future period of time over which sales are estimated for the first merchant. Additionally, or alternatively, the service provider 102 may determine that a current sales rate of an item has increased, which will result in the inventory of the item reaching a threshold lower limit within a particular period of time (e.g., will reach a point at which the second merchant lacks inventory of the item). In other words, the service provider 102 may determine a lack of inventory of the item by determining that the inventory of the item is below a level that will satisfy the increase in the sales rate.

At 914, the service provider 102 may communicate with one or more merchant devices regarding transportation of inventory between merchants. For example, based on the determination that the first merchant has extra inventory (at operation 910), the service provider 102 may send a communication to a device associated with the first merchant suggesting that at least a portion of the extra inventory be offered for acquisition to other merchants (e.g., be sold to others). The service provider 102 may then receive input from the device associated with the first merchant indicating whether or not the first merchant is willing to offer inventory for acquisition to others. If the input indicates that the first merchant is willing to offer the inventory for acquisition, the inventory may be made available for purchase by others.

Additionally, or alternatively, based on the determination that the second merchant lacks inventory of an item (at operation 912), the service provider 102 may send a notification to a device associated with the second merchant recommending that the second merchant order additional inventory. For example, the notification may indicate that the inventory of the item for the second merchant is below an inventory threshold. If the service provider 102 may receives input from the device associated with the second merchant requesting additional inventory of the item, the service provider 102 may find a merchant to satisfy the request, as discussed below. In some instances, the input from the second merchant requests a time by which to receive additional inventory of the item, a number of items to be provided in the additional inventory of the item, a cost for the additional inventory of the item, a particular characteristic of an item, and so on.

In FIG. 9B, at 916, the service provider 102 may determine to transport inventory for the first merchant to the second merchant. That is, the service provider 102 may determine to utilize extra inventory of an item for the first merchant to satisfy a lack of inventory of the item for the second merchant. As such, the service provider 102 may select the first merchant to satisfy the lack of inventory of the item for the second merchant. For example, the first merchant may be selected based on a variety of information, such as a proximity of the first merchant to the second merchant (e.g., the first merchant may be selected if located within a predetermined proximity to the second merchant), a proximity of a courier to the first merchant (e.g., the first merchant may be selected if a courier is located within a predetermined proximity to the first merchant), a number of items of the extra inventory for the first merchant (e.g., the first merchant may be selected if the extra inventory of the item has a quantity that is greater than or equal to a quantity needed by the second merchant), a cost at which the extra inventory of the item is being offered for acquisition (e.g., the first merchant may be selected if the cost is less than or equal to a particular cost, such as a requested cost by the second merchant, a predetermined cost, a preference cost provided by the second merchant, etc.), and so on. In some instances, one or more of the above factors may used with a different weighting applied to each factor.

In one example, the service provider 102 may select the extra inventory of the item for the first merchant to satisfy the lack of inventory of the item for the second merchant when the extra inventory of the item is able to be transported to an establishment of the second merchant by a particular time. For example, based on locations of the first and second merchants, and a location of a courier, it may be determined that the extra inventory of the item may be delivered within a few hours of the second merchant placing an order for additional inventory.

At 918, the service provider 102 may identify (e.g., determine or select) a courier to transport inventory of the item for the first merchant to the second merchant. The courier may be identified based on a location of the courier (e.g., location of associated device), a fee for delivery paid to the courier, a mode of transportation used by the courier (e.g., plane, car, bike, on foot, etc.), and so on. In one example, a particular courier is selected based on the courier being located within a predetermined proximity to the first merchant (and/or the second merchant). In another example, a particular courier is selected when it is determined that the courier is able to transport the extra inventory of the item to the establishment of the second merchant by a particular time. In some instances, multiple couriers may be identified (or selected) to make a delivery, such as in cases where it is determined that multiple trips will be required to deliver inventory (due to a quantity of the items, a size of the items, a difficulty in transporting the items, a storage capacity of a courier, etc.).

At 920, the service provider 102 may send a communication to cause inventory of the item for the first merchant to be transported to the second merchant. In one example, the service provider 102 may send a communication to a courier device requesting that the associated courier transport inventory of the item from an establishment of the first merchant to an establishment of the second merchant. The communication may include any information that may be necessary to deliver the inventory, such as location information for the first merchant and/or the second merchant, a time by which the delivery needs to be made, a number of items to delivery, etc. If multiple trips are necessary, the communication may additionally indicate that multiple trips will be required to transport the extra inventory of the item. The courier may then transport the extra inventory of the item in one or more trips. In another example, the service provider 102 may send a communication to the first merchant requesting that the first merchant personally deliver, ship (e.g., through mail, or otherwise deliver inventory of the item). As such, in some instances the merchant may act as a courier for delivery of the items.

In some instances, at 920, the service provider 102 may recommend a period of time for delivery of inventory. For example, the service provider 102 may determine that a period of time is associated with less than a threshold number of deliveries for a courier. In other words, the service provider 102 may determine a downtime period during which the courier has relatively few deliveries. This period of time may be indicated to the courier in the communication that is sent at operation 920. Alternatively, or additionally, the service provider 102 may notify the courier that the delivery may be made at any time when deliveries are not scheduled. This may allow the courier to make the delivery when the courier is not otherwise busy.

At 922, the service provider 102 may offer one or more items for acquisition. In one example, inventory of the item for the first merchant is offered to the second merchant for less than an amount at which the items are being offered for acquisition by a supplier (e.g., less than a normal supplier price). In another example, the extra inventory of the item is offered at a same cost as a supplier. In yet another example, the extra inventory is offered at a greater cost than a supplier. Here, the service provider 102 may determine that the second merchant has requested the inventory by a particular time (e.g., in a relatively urgent manner). As such, the cost of the item may be increased (e.g., to account for the urgency of the order).

At 924, the service provider 102 may cause payment to be made to the first merchant, the second merchant, and/or the courier. This may include sending a communication to cause funds to be transferred from an account associated with the second merchant (e.g., bank account) to an account associated with the first merchant (e.g., bank account). The funds may be transferred to pay for inventory that is provided by the first merchant. As such, the funds may be in an amount that is based on a cost of items that are provided to the second merchant. The communication may be sent to a bank computing device and/or a card payment network computing device. Additionally, or alternatively, a communication may be sent to cause funds to be transferred to the courier that transported inventory of the item. In some instances, the second merchant may pay for the courier fees, while in other instances the first merchant may pay for the courier fees or other parties.

Figure 10A:
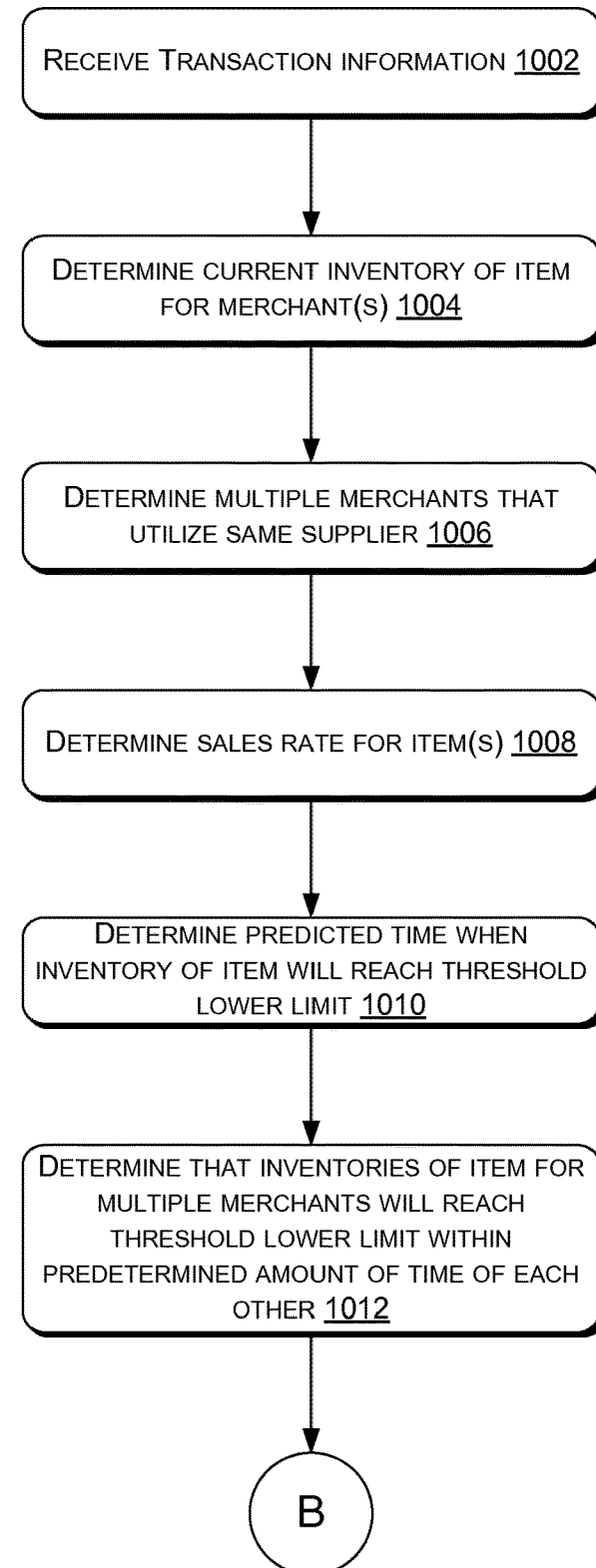
FIGS. 10A and 10B illustrate an example process to coordinate the ordering of items across merchants.
Figure 10B:
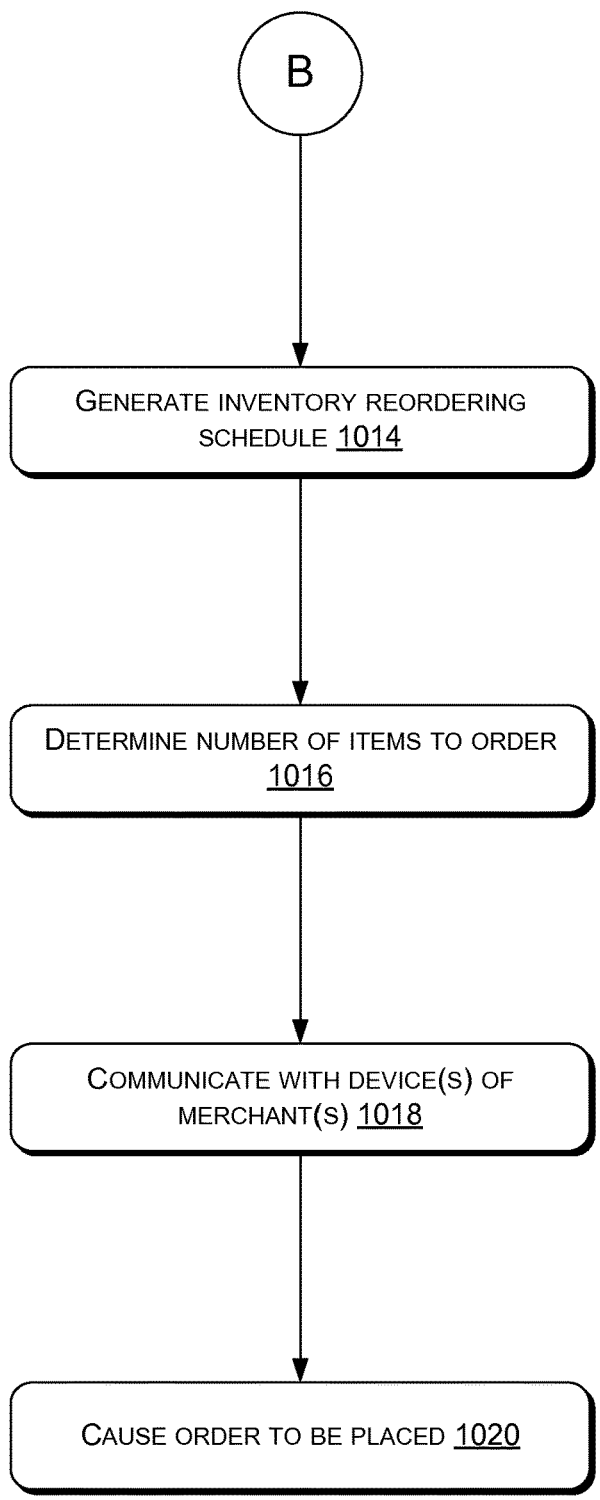

FIGS. 10A and 10B illustrate the example process 1000 to coordinate the ordering of items across merchants.

At 1002, the service provider 102 may receive transaction information. The transaction information may be from a plurality of merchant devices associated with a plurality of different merchants.

At 1004, the service provider 102 may determine a current inventory of an item for individual ones of the plurality merchants. In one example, the service provider 102 may maintain a list of inventory of an item (e.g., a quantity of an item in stock) by receiving information from a merchant device indicating a quantity of items currently in stock (e.g., upon an initial stocking of the items) and updating the list of inventory as transaction information is received from the merchant device regarding sales of items.

At 1006, the service provider 102 may determine multiple merchants that utilize a same supplier (e.g., for a same item, for similar items, etc.). In one example, the service provider 102 may order items from a supplier on behalf of the merchant. As such, the service provider 102 may maintain information about suppliers and utilize that information in determining multiple merchants that utilize a same supplier. In another example, a merchant may send information to the service provider 102 identifying a supplier, such as a preferred supplier, a supplier that is typically used (e.g., more than a number of times), etc. In any event, the service provider 102 may compare suppliers that are utilized by merchants (and items ordered from those suppliers) to identify merchants that utilize a same supplier for an item (e.g., a same item, similar items that have a particular number of the same characteristics, etc.). Alternatively, or additionally, the service provider 102 may reference a list of suppliers to determine that multiple merchant are likely (e.g., more than a threshold) to use the same supplier due to proximity of the merchants to the supplier.

At 1008, the service provider 102 may determine a sales rate for one or more items (e.g., a number of items sold over a period of time). This may be with respect to a particular merchant, a number of merchants of a same merchant category, or any number of merchants. The sales rate may be determined based on transaction information.

At 1010, the service provider 102 may determine a predicted time when inventory of an item for a merchant will reach a threshold lower limit. The predicted time may be determined based on a current inventory of the item for the merchant and/or a sales rate of the item.

At 1012, the service provider 102 may determine that inventories of an item for multiple merchants will reach a threshold lower limit within a predetermined amount of time of each other. For example, the service provider 102 may determine that a predicted time when inventory of an item for a first merchant will reach a threshold lower limit is within a particular number of days, weeks, months, etc. of a predicted time when inventory of the item for a second merchant will reach the threshold lower limit.

In FIG. 10B, at 1014, the service provider 102 may generate an inventory reordering schedule. The inventory reordering schedule may generally designate times for merchants to order items from a supplier. For example, the inventory reordering schedule may designate (e.g., set) a first time for ordering additional inventory of an item for a first merchant and designate a second, different time for ordering additional inventory of the item for a second merchant. A designated time may be before a predicted time when inventory of an item will reach a threshold lower limit. The inventory reordering schedule may designated times that are separated by more than a threshold amount of time to enable a supplier to obtain further supply of an item. For example, the inventory reordering schedule may designate a first time for a first merchant to order additional inventory that is more than a number of days away from a second time to enable the supplier to obtain further supply of the item. In some instances, the inventory reordering schedule may be generated when it is determined that inventories of an item for multiple merchants will reach a threshold lower limit within a predetermined amount of time of each other.

The inventory reordering schedule may be generated based on a variety of information. In some examples, the inventory reordering schedule may be based on a current inventory level of an item for a merchant, a sales rate of an item for a merchant, a current supply of an item for a supplier (e.g., a number of items currently in stock for distribution to merchants), a sales rate of an item for a supplier (e.g., a number of items distributed to merchants over a period of time), a rate at which an item may be acquired by a supplier from another supplier, a rate at which an item may be manufactured, and so on. In other examples, the inventory reordering schedule may be based on a previous amount of time for shipment of an item or another item from a supplier, a previous amount of time for shipment of an item or another item from another supplier, and so on. In yet further examples, the inventory reordering schedule may be based on when a merchant has previously ordered items. To illustrate, if the service provider 102 determines, based on previous orders, that a merchant previously ordered additional inventory of an item when the inventory of the item reached a threshold lower limit, the service provider 102 may designate a future time for the merchant to order additional inventory to be at a particular amount of time before a predicted time when the inventory of the item will reach the threshold lower limit.

At 1016, the service provider 102 may determine a number of items to order for a merchant. In one example, a number of items to order may be based on a previous number of items ordered by a merchant (e.g., from a particular supplier or any supplier) to replenish inventory of the item. In another example, a number of items to order for a merchant may be based on a previous number of items ordered by another merchant of a similar or same merchant category. In yet another example, a number of times to order may be based on a predicted sales rate of an item over a future period of time (e.g., a next month). A number of items to order may be greater than a number of items that have been previously ordered or greater than a number of items predicted to be sold over a future time period.

At 1018, the service provider 102 may communicate with one or more devices of one or more merchants regarding ordering additional inventory. In one example, the service provider 102 may request pre-authorization to order inventory of an item for a merchant. Here, the service provider 102 may sending a notification to a device associated with a merchant requesting authorization for automatic ordering. The service provider 102 may receive user input authorizing automatic ordering and, thereafter (e.g., when a designated time in an inventory reordering schedule approaches), automatically place an order for the merchant. In another example, the service provider 102 may determine that a time designated in an inventory reordering schedule is approaching (e.g., a current time is within a window of time before the designated time), and send a notification to a device associated with a merchant recommending that the merchant order additional inventory. The service provider 102 may receive user input requesting that the additional inventory of the item be ordered and, in response, place an order for the merchant.

In some instances, the service provider 102 may offer a discount to a merchant for ordering an item according to an inventory reordering schedule. The offer may be made when a notification is provided to the merchant, at the time of actual purchase of additional inventory from a supplier, or at any other time. The discount may include a reduced value for additional inventory of an item, a reduced value for another item supplied by the supplier, another item supplied by another supplier, and so on.

As noted above, operations of the process 1000 may be performed in any order. In one example, operation 1018 is performed before operation 1014, while in other instances operation 1018 is performed after operation 1014, such as that shown in FIG. 10B.

At 1020, the service provider 102 may cause an order to be placed with a supplier. The order may generally be placed according to an inventory reordering schedule. Operation 1020 may include providing a notification to inform a merchant to order additional inventory (e.g., so that the merchant may contact a supplier), ordering the additional inventory on behalf of the merchant (e.g., contacting the supplier for the merchant), and so on. As noted above, in some examples an order is automatically placed for additional inventory (e.g., for a merchant that has opted-in for automatic ordering) when a designated time of an inventory reordering schedule approaches. In other examples, an order is placed in response to receiving user input requesting to do so.

Figure 11:
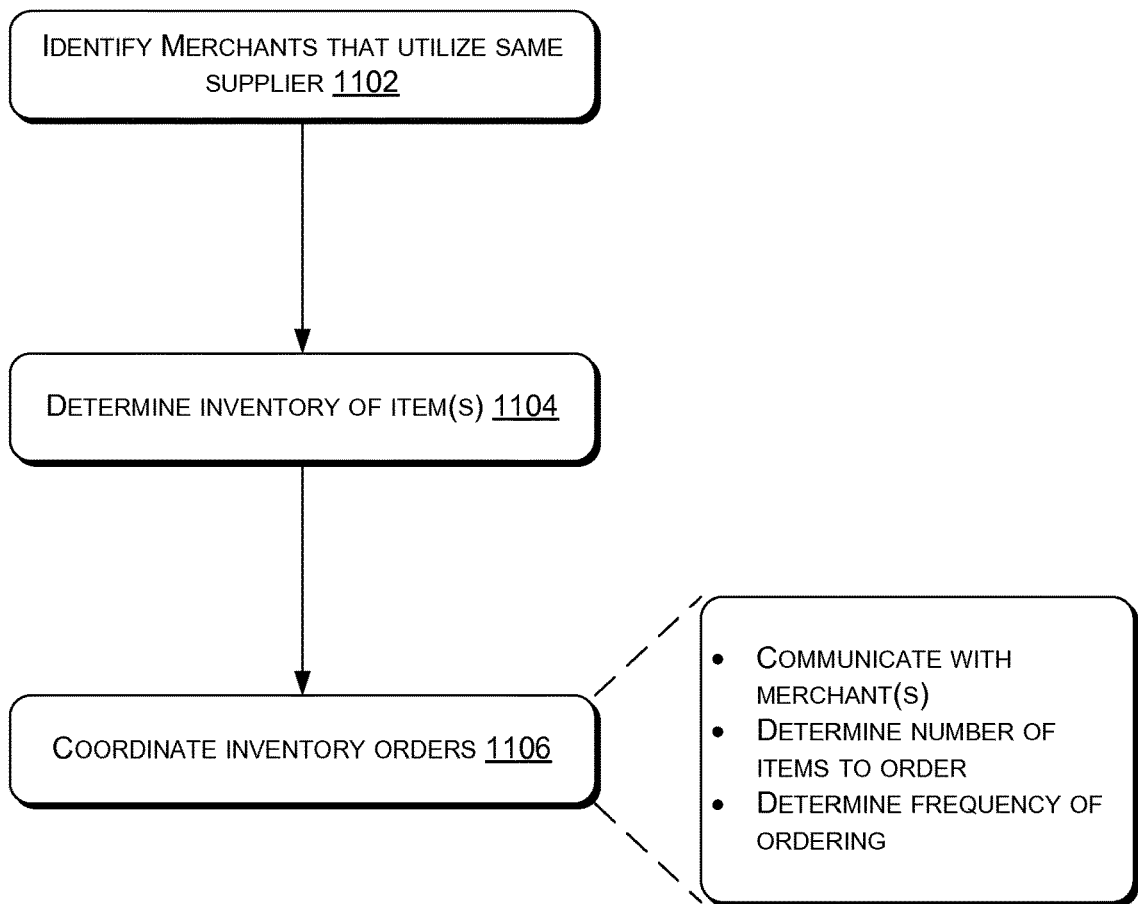
FIG. 11 illustrates another example process to coordinate the ordering of items across merchants.

FIG. 11 illustrates the example process 1100 to coordinate the ordering of items across merchants.

At 1102, the service provider 102 may identify merchants that utilize a same supplier. In some instances, operation 1102 may include similar processing at that discussed above in reference to operation 1006 of FIG. 10A.

At 1104, the service provider 102 may determine inventory of one or more items for one or more merchants. In some instances, operation 1104 may include similar processing at that discussed above in reference to operation 1004 of FIG. 10A.

At 1106, the service provider 102 may coordinate inventory orders of an item with a supplier. This may cause an order for an item to be placed for a first merchant at a first time that is more than a threshold amount of time away from a second time when an order for the item is placed for a second merchant. Operation 1106 may include causing orders of an item for a merchant to be placed more frequently (or less frequently) than orders have been placed by the merchant in the past. Additionally, or alternatively, operation 1106 may include causing an order for an item to be placed for a merchant in greater (or lesser) quantity than an order that has been previous placed by the merchant. Further, inventory orders may be coordinated based on a current supply of an item for a supplier, a current inventory of an item for a merchant, a previous amount of time for shipment, and so on.

In some instances, inventory orders may be coordinated by communicating with a merchant. For example, the service provider 102 may send a notification to a device associated with a merchant requesting authorization for automatic ordering. The merchant may provide user input authorizing automatic ordering. The service provider 102 may then automatically order additional inventory for the merchant when it is determined that a particular time is approaching (e.g., a time designated for ordering inventory in an inventory reordering schedule). In another illustration, the service provider 102 may determine that a time designated in an inventory reordering schedule is approaching (e.g., a current time is within a window of time to the designated time), and send a notification to a device associated with a merchant recommending that additional inventory be ordered. The merchant may provide user input requesting that the additional inventory of the item be ordered and the service provider 102 may order the additional inventory for the merchant.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A server computing device associated with a payment-processing service configured to perform inventory management services, the server computing device comprising:
   one or more processors; and
   one or more computer readable media storing instructions executable by the one or more processors, the instructions, when executed by the one or more processors, cause the one or more processors to:
   receive transaction information from a first merchant device associated with a first merchant and a second merchant device associated with a second merchant wherein the transaction information is received via respective instances of a point-of-sale application controlled by the payment-processing service and wherein the first merchant and the second merchant have established accounts with the payment-processing service, and wherein the first merchant is unaffiliated with the second merchant;

manage inventory of items for the first merchant and the second merchant based at least in part on the transaction information;

determine, based at least in part on the transaction information, that the first merchant has an extra inventory of an item by determining that a number of items in inventory of the item for the first merchant is more than an estimated number of items to be sold by the first merchant over a first future period of time and that at least a portion of the inventory of the item for the first merchant has remained at a first merchant location associated with the first merchant for more than a predetermined amount of time;

determine, based at least in part on the transaction information, that the second merchant lacks inventory of the item by determining that a number of items in inventory of the item for the second merchant is less than an estimated number of items to be sold by the second merchant over a second future period of time, the second future period of time being shorter than the first future period of time;

at least partly in response to determining that the first merchant has the extra inventory of the item the second merchant lacks the inventory of the item, automatically create an inventory reordering schedule to order the item from the first merchant for the second merchant, wherein the item is automatically ordered at a designated time without input from the first merchant or the second merchant;

at least in response to ordering the item from the first merchant for the second merchant, determine a fulfillment service to deliver the item from the first merchant location to a second merchant location associated with the second merchant;

at least partly in response to determining the fulfillment service, determine a time associated with a delivery of the item to the second merchant, wherein the time associated with the delivery is based at least in part on an availability of the fulfillment service, wherein the availability of the fulfillment service comprises the fulfillment service being associated with less than a threshold number of other deliveries at the time;

at least partly in response to determining the fulfillment service and the time, send a communication to a computing device associated with the fulfillment service requesting that the fulfillment service transport the extra inventory of the item from the first merchant location to the second merchant location by the time; and at least partly in response to ordering the item and sending the communication, cause funds from an account associated with the second merchant to be transferred to an account associated with the first merchant.

2. The server computing device of cam 1, wherein the instructions further cause the one or more processors to determine that the fulfillment service is able to transport the extra inventory of the item to the second merchant location by the time based at least in part on the location information for the computing device associated with the fulfillment service.

3. The server computing device of claim 1, wherein the instructions further cause the one or more processors to estimate the number of items to be sold by the first merchant over the first future period of time based on at least one of a current sales rate of the item for the first merchant or a previous sales rate of the item for the first merchant.

4. The server computing device of claim 1, wherein the automatic ordering of the item for the second merchant includes determining that a cost at which the extra inventory of the item is being offered for acquisition is less than a predetermined amount.

5. One or more non-transitory computer-readable media storing executable instructions that, when executed by one or more processors, cause the one or more processors to perform operations comprising:

identifying, by a server computing device associated with a payment-processing service that is configured to perform inventory management services, a first inventory of the item associated with a first merchant, and a second inventory of the item associated with the second merchant that is unaffiliated with the first merchant, wherein the first inventory of the item is determined based at least in part on first transaction data associated with the first merchant and the second inventory of the item is determined based at least in part on second transaction data associated with the second merchant;

determining, by the server computing device, that the first merchant has extra inventory of the item based at least in part on determining that at least a portion of the first inventory of the item has remained at a first merchant location associated with the first merchant for more than a predetermined amount of time;

determining, by the server computing device and based at least in part on the second inventory of the item, that the second merchant lacks inventory of the item;

at least partly in response to determining that the first merchant has the extra inventory of the item, and the second merchant lacks the inventory of the item, automatically generate an inventory reordering schedule for ordering, by the server computing device, the item for the second merchant from the first merchant, wherein the item is automatically ordered at a designated time without input from either of the first merchant or the second merchant;

at least partly in response to ordering the item, determining, by the server computing device, a delivery service to deliver the item from the first merchant location to a second merchant location associated with the second merchant;

at least partly in response to determining the delivery service, determining, by the server computing device, a time associated with a delivery of the item to the second merchant location, wherein the time is based at least in part on an availability of the delivery service to deliver the item; and at least partly in response to ordering the item and determining the delivery service, sending, by the server computing device and to a computing device associated with the delivery service, a communication requesting that the delivery service transport the item from the first merchant location to the second merchant location by the time.

6. The one or more non-transitory computer-readable media of claim 5, wherein the automatic ordering of the item for the second merchant includes determining that the first merchant location is within a predetermined proximity to the second merchant location associated with the second merchant.

7. The one or more non-transitory computer-readable media of claim 5, wherein the automatic ordering of the item for the second merchant includes determining that a third location of a computing device associated with the delivery service within a predetermined proximity to at least one of the first merchant location or the second merchant location.

8. The one or more non-transitory computer-readable media of claim 5, wherein the automatic ordering of the item for the second merchant includes determining that a cost at which the extra inventory of the item is being offered for acquisition is less than a predetermined amount.

9. The one or more non-transitory computer-readable media of claim 5, wherein the determining that the second merchant lacks the inventory of the item includes determining that a number of items in the second inventory is less than the estimated number of items to be sold by the second merchant over the future period of time.

10. The one or more non-transitory computer-readable media of claim 5, wherein the determining that the first merchant has the extra inventory further comprises determining that a number of items in the first inventory is more than a estimated number of items to be sold by the first merchant over a future period of time.

11. The one or more non-transitory computer-readable media of claim 5, wherein the instructions cause the one or more processors to further perform operations comprising:
determining a period of time that is associated with less than a threshold number of deliveries for the delivery service,
wherein the communication further comprises an instruction to pick up the item at the first merchant location during the period of time that is associated with less than the threshold number of deliveries for the delivery service and deliver the item to the second merchant location.

12. The one or more non-transitory computer-readable media of claim 5, wherein the instructions cause the one or more processors to further perform operations comprising:
determining, by the server computing device, a delivery route to transport the item between the first merchant location and the second merchant location, wherein the communication further comprises the delivery route.

13. The one or more non-transitory computer-readable media of claim 5, wherein the instructions cause the one or more processors to further perform operations comprising:
sending, to the first merchant device, a notification comprising at least one of:
an address associated with the second merchant location;
a quantity of the item to be delivered; or
contact information associated with the second merchant.

14. A system associated with a payment-processing service configured to perform inventory management services, the system comprising:
one or more processors; and
memory communicatively coupled to the one or more processors and storing executable instructions that, when executed by the one or more processors, cause the one or more processors to perform operations comprising:
receiving transaction information from a first merchant device associated with a first merchant and a second merchant device associated with a second merchant that is unaffiliated with the first merchant, wherein the transaction information is received via respective instances of an application controlled by the payment-processing service;
identifying, for each of a first merchant located at a first merchant location and a second merchant located at a second merchant location and based at least in part on the transaction information, an inventory of an item for the respective merchant;
determining that the first merchant has extra inventory of the item based at least in part on determining that at least a portion of the inventory of the item for the first merchant has remained at the first merchant location for more than a predetermined amount of time;
determining that the second merchant lacks inventory of the item;
at least partly in response to determining that the first merchant has the extra inventory of the item and the second merchant lacks inventory of the item, automatically creating an inventory reordering schedule for ordering the item from the first merchant for the second merchant at a designated time without input from either of the first merchant or the second merchant;
at least partly in response to ordering the item, identifying a delivery service to deliver the item from the first merchant location to the second merchant location;
at least partly in response to identifying the delivery service, determining a time associated with a delivery of the item based at least in part on an availability of the delivery service; and
at least partly in response to ordering the item and identifying the delivery service, sending a communication to a computing device associated with the delivery service, the communication including an instruction to deliver the item by the time and a delivery route for the item from the first merchant location to the second merchant location.

15. The system of claim 14, wherein the automatic ordering of the item for the second merchant includes determining that the first merchant location is within a threshold distance to the second merchant location associated with the second merchant.

16. The system of claim 14, wherein identifying the delivery service is further based at least in part on determining that the location of a computing device associated with the delivery service is within a threshold distance to the second merchant location associated with the second merchant.

17. The system of claim 14, wherein the automatic ordering of the item for the second merchant includes determining that a cost at which the extra inventory is being offered for acquisition is less than a predetermined amount.

18. The system of claim 14, wherein the determining that the second merchant lacks the inventory of the item includes determining that a number of items in the inventory of the item for the second merchant is less than an estimated number of items to be sold by the second merchant over a future period of time.

19. The system of claim 14, wherein the determining that the first merchant has the extra inventory comprises further determining that a number of items in the inventory of the item for the first merchant is more than an estimated number of items to be sold by the first merchant over a future period of time.

20. The system of claim 14, wherein the operations further comprise:
determining a period of time that is associated with less than a threshold number of deliveries for the delivery service,
wherein the communication comprises an instruction to pick up the item at the first location during the period of time that is associated with less than the threshold number of deliveries and deliver the item to the second location.

* * * * *